(12) United States Patent
Igarashi et al.

(10) Patent No.: US 12,483,850 B2
(45) Date of Patent: Nov. 25, 2025

(54) INFORMATION PROCESSING APPARATUS, INFORMATION PROCESSING METHOD, AND INFORMATION PROCESSING PROGRAM

(71) Applicant: Sony Group Corporation, Tokyo (JP)

(72) Inventors: Go Igarashi, Tokyo (JP); Naoki Shinmen, Tokyo (JP); Kohei Asada, Kanagawa (JP); Yoshiyuki Kuroda, Chiba (JP); Masaki Kamata, Tokyo (JP)

(73) Assignee: Sony Group Corporation, Tokyo (JP)

( * ) Notice: Subject to any disclaimer, the term of this patent is extended or adjusted under 35 U.S.C. 154(b) by 336 days.

(21) Appl. No.: 18/026,880

(22) PCT Filed: Aug. 19, 2021

(86) PCT No.: PCT/JP2021/030340
§ 371 (c)(1),
(2) Date: Mar. 17, 2023

(87) PCT Pub. No.: WO2022/064905
PCT Pub. Date: Mar. 31, 2022

(65) Prior Publication Data
US 2023/0336934 A1    Oct. 19, 2023

(30) Foreign Application Priority Data
Sep. 25, 2020   (JP) .............................. 2020-161522

(51) Int. Cl.
*H04S 7/00*   (2006.01)
*G06F 3/14*   (2006.01)
(52) U.S. Cl.
CPC ............ *H04S 7/302* (2013.01); *G06F 3/1423* (2013.01); *H04S 2400/11* (2013.01)

(58) Field of Classification Search
CPC ......... G06F 3/1423; G06F 3/162; G06F 3/165
(Continued)

(56) References Cited

U.S. PATENT DOCUMENTS 11,666,825 B2*  6/2023  Delamont ............. G06T 19/006
                                                          463/32
2003/0174796 A1*  9/2003  Isozaki ................... H04L 65/80
                                                          375/E7.278
(Continued)

FOREIGN PATENT DOCUMENTS

JP      2001078282 A      3/2001
JP      2004187288 A      7/2004
(Continued)

OTHER PUBLICATIONS

International Search Report and English translation thereof mailed Nov. 2, 2021 in connection with International Application No. PCT/JP2021/030340.

*Primary Examiner* — Alexander Krzystan
(74) *Attorney, Agent, or Firm* — Wolf, Greenfield & Sacks, P.C.

(57) ABSTRACT

An information processing apparatus (30) includes a sound source extraction unit (341) and a mapping processing unit (343). The sound source extraction unit (341) extracts one or more audio data (AD) corresponding to different sound sources from audio content (AC). The mapping processing unit (343) selects, for each audio data (AD), one or more display units (12) to serve as mapping destinations of the audio data (AD) from one or more combinable display units (12) including a sound producing mechanism.

19 Claims, 30 Drawing Sheets

(58) Field of Classification Search
USPC .......................................................... 700/94
See application file for complete search history.

(56) References Cited

U.S. PATENT DOCUMENTS

| | | | | |
|---|---|---|---|---|
| 2009/0082961 | A1* | 3/2009 | Tanaka | G01C 21/26 |
| | | | | 701/431 |
| 2011/0197225 | A1 | 8/2011 | Kitashou | |
| 2013/0275873 | A1* | 10/2013 | Shaw | G01B 21/00 |
| | | | | 715/716 |
| 2014/0314391 | A1* | 10/2014 | Kim | G06F 3/04842 |
| | | | | 386/248 |
| 2016/0161594 | A1* | 6/2016 | Benattar | H04S 7/40 |
| | | | | 367/107 |

FOREIGN PATENT DOCUMENTS

| | | | |
|---|---|---|---|
| JP | 2008-011475 A | 1/2008 | |
| JP | 2008-167032 A | 7/2008 | |
| JP | 2011-259298 A | 12/2011 | |

* cited by examiner

FIG.29
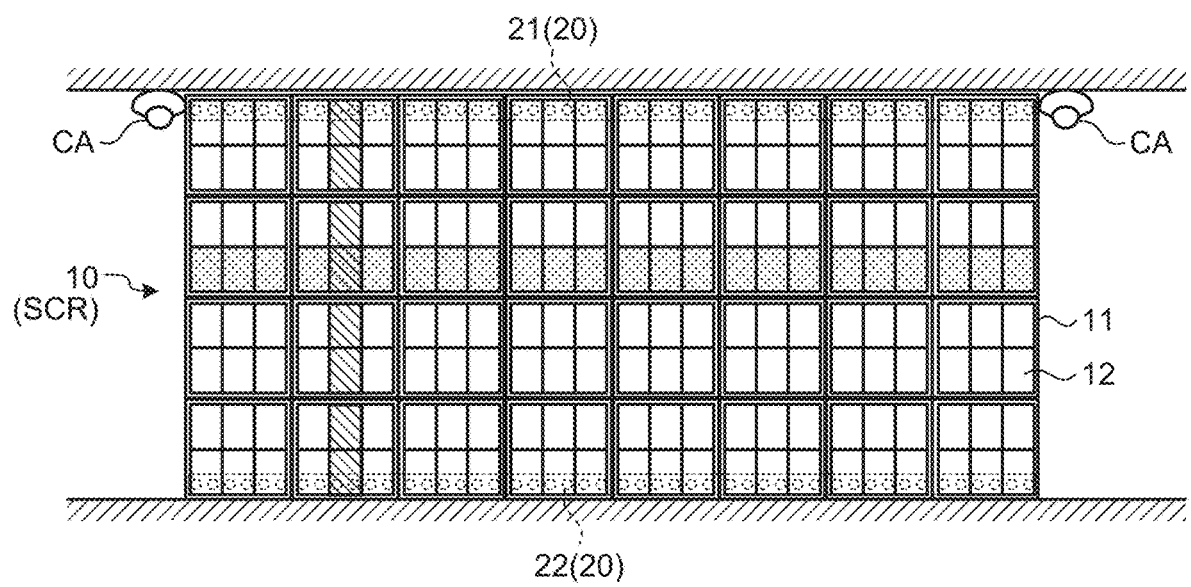
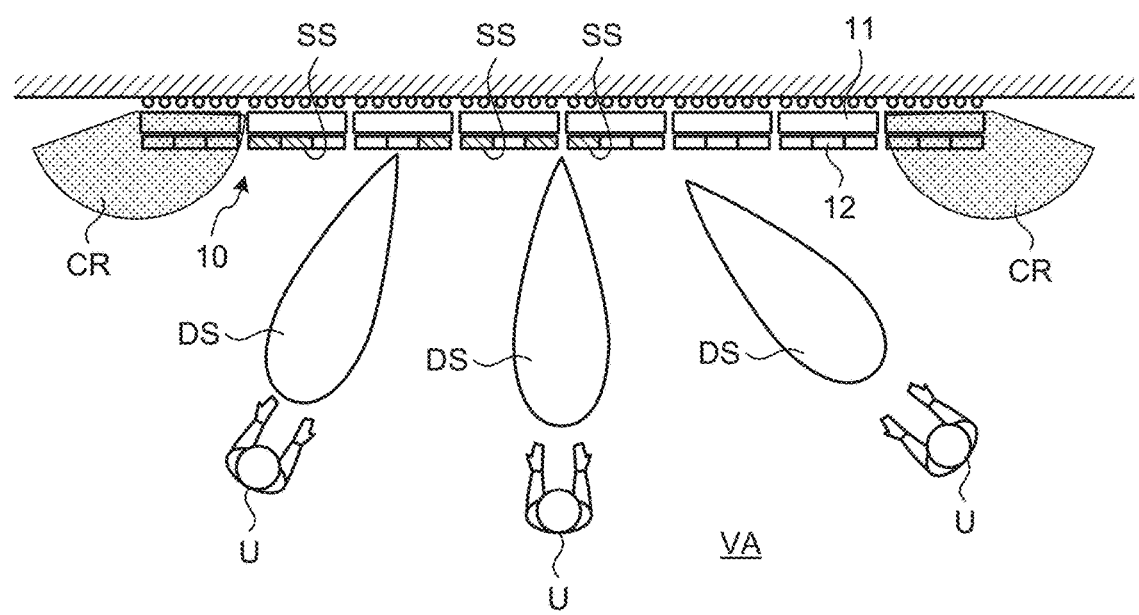

FIG.36
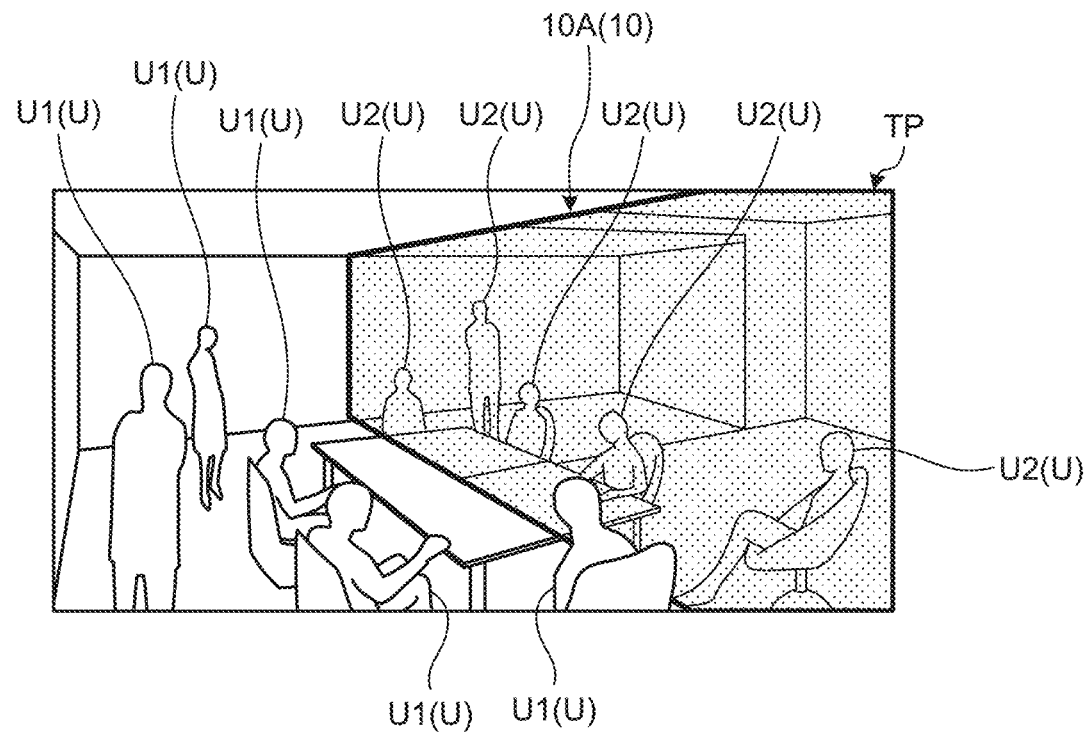
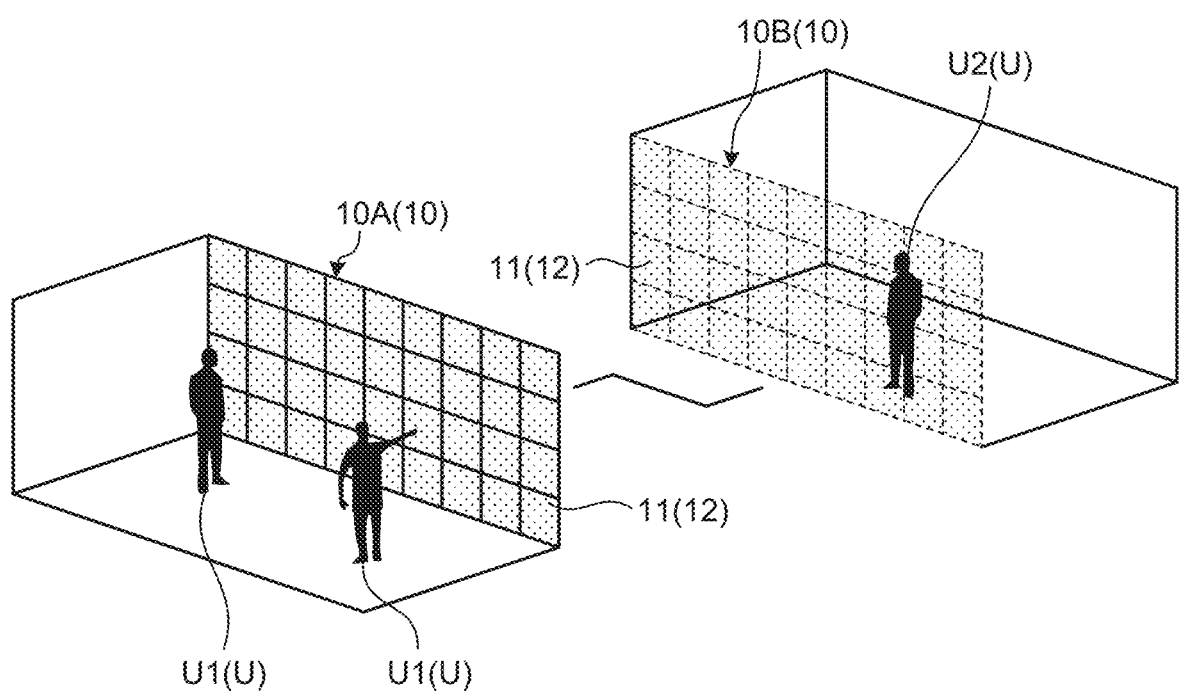

FIG.38
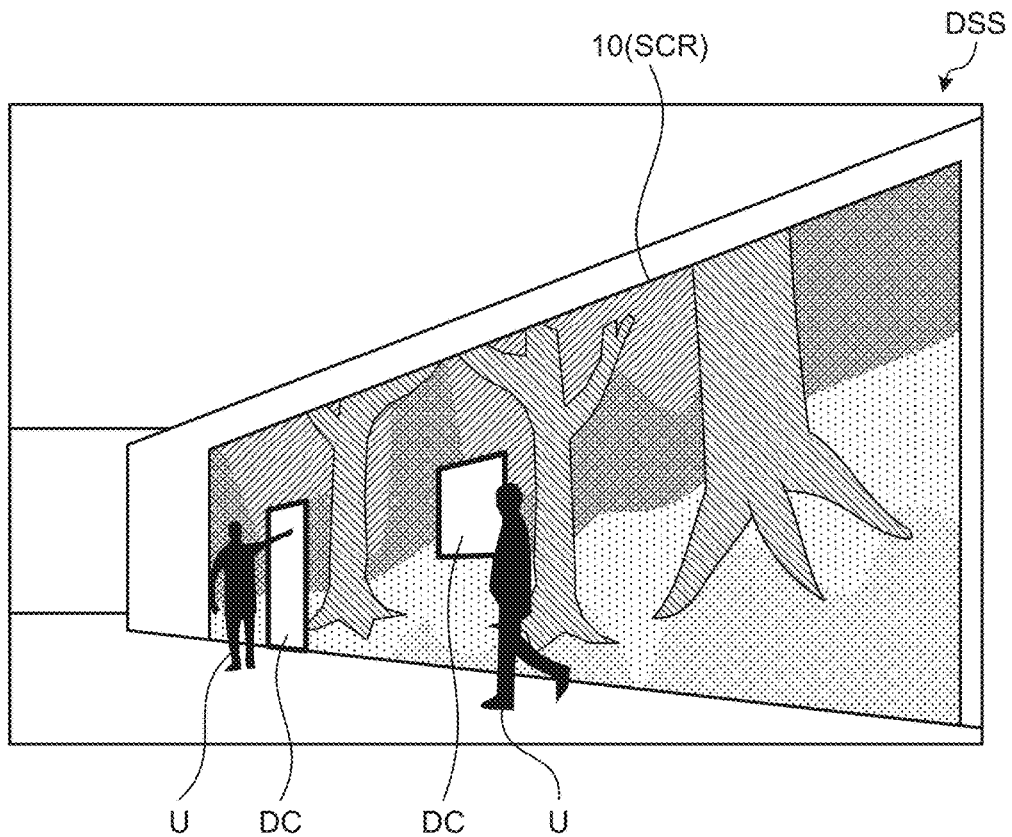
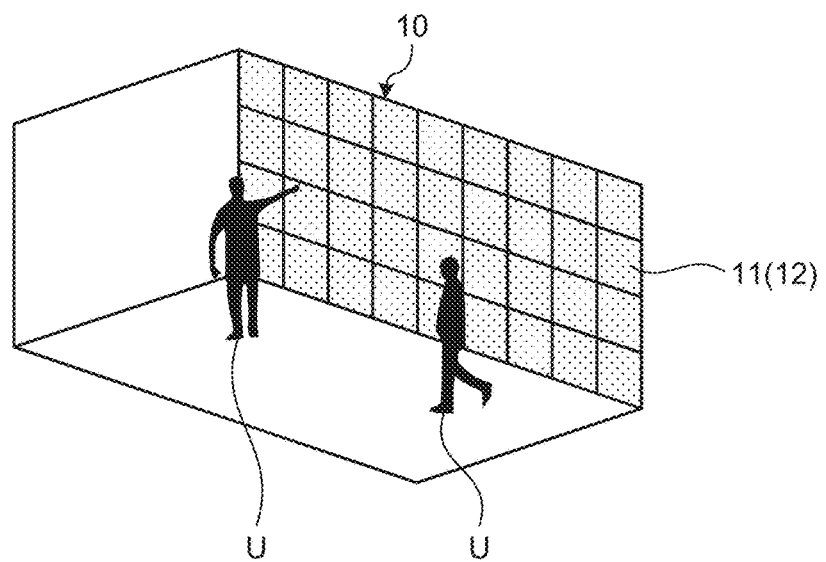

INFORMATION PROCESSING APPARATUS, INFORMATION PROCESSING METHOD, AND INFORMATION PROCESSING PROGRAM

CROSS-REFERENCE TO RELATED APPLICATIONS

This application claims the benefit under 35 U.S.C. § 371 as a U.S. National Stage Entry of International Application No. PCT/JP2021/030340, filed in the Japanese Patent Office as a Receiving Office on Aug. 19, 2021, which claims priority to Japanese Patent Application Number JP2020-161522, filed in the Japanese Patent Office on Sep. 25, 2020, each of which is hereby incorporated by reference in its entirety.

FIELD

The present invention relates to an information processing apparatus, an information processing method, and a program.

BACKGROUND

A technique for interlocking a sound field and a video using a plurality of speakers is known. For example, Patent Literature 1 discloses a system that controls a position of a phantom sound image in conjunction with a position of a sound source displayed on a display.

CITATION LIST

Patent Literature

Patent Literature 1: JP 2011-259298 A

SUMMARY

Technical Problem

In a phantom sound image method, a range of a viewing position where the sound image is correctly reproduced is narrow. Therefore, it is difficult to obtain a sense of unity between the video and the audio.

Therefore, the present disclosure proposes an information processing apparatus, an information processing method, and a program that make it easy to obtain a sense of unity between the video and the audio.

Solution to Problem

According to the present disclosure, an information processing apparatus is provided that comprises: a sound source extraction unit that extracts one or more audio data corresponding to different sound sources from audio content; and a mapping processing unit that selects, for each audio data, one or more display units to serve as mapping destinations of the audio data from one or more combinable display units including a sound producing mechanism. According to the present disclosure, an information processing method in which an information process of the information processing apparatus is executed by a computer, and a program for causing the computer to execute the information process of the information processing apparatus, are provided.

BRIEF DESCRIPTION OF DRAWINGS

FIG. 29 is a diagram illustrating an example of distributing different reproduction sounds for each viewer.

FIG. 36 is a diagram illustrating an example in which the audio/video content output system is applied to a telepresence system.

FIG. 38 is a diagram illustrating an example in which the audio/video content output system is applied to a digital signage system.

DESCRIPTION OF EMBODIMENTS

Hereinafter, embodiments of the present disclosure will be described in detail with reference to the drawings. In each of the following embodiments, the same parts are denoted by the same reference signs, and redundant description will be omitted.

Note that the description will be given in the following order.

[1. Overview of audio/video content output system]
[1-1. Configuration example of system]
[1-2. Configuration of control system]
[1-3. Configuration and arrangement form of display units]
[1-4. Logical number of display units]
[1-5. Connection form between cabinet and control system]
[1-6. Connection form between cabinet and display units]
2. First Embodiment
[2-1. Image of system]
[2-2. Mapping processing of audio data of channel-based audio]
[2-3. Mapping processing of audio data of object-based audio]
[2-4. Sound source arrangement using DNN engine]
[2-5. Control of sound image in depth direction]
[2-6. Localization and emphasis control of sound image]
[2-6-1. Enhancement of sound image localization capability by enlargement of band]
[2-6-2. Enhancement of sound image localization capability by preceding sound effect]
[2-7. Arrangement of speaker units]
[2-8. Method of detecting positions of display units]
[2-9. Directivity control of reproduction sound]
[2-10. Information processing method]
[2-11. Effects]
3. Second Embodiment
[3-1. Image of system]
[3-2. Arrangement of speaker units]
[3-3. Measurement of spatial characteristics and reverberation cancellation by built-in microphones]
4. Third Embodiment
[4-1. Image of system]
[4-2. Sound collection and reproduction of object sound]
5. Fourth Embodiment 1. Overview of Audio/Video Content Output System

Figure 1:
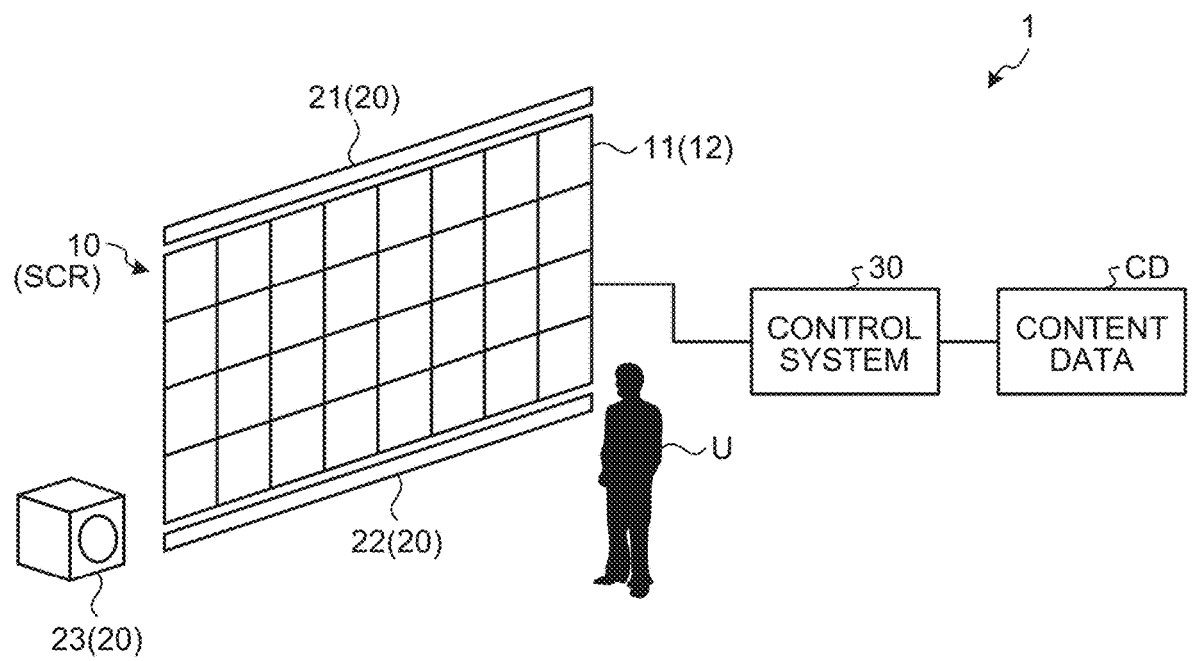
FIG. 1 is a diagram illustrating a schematic configuration of an audio/video content output system.

[1-1. Configuration Example of System]
FIG. 1 is a diagram illustrating a schematic configuration of an audio/video content output system 1.

The audio/video content output system 1 is a system that reproduces audio/video content from content data CD and presents the audio/video content to a viewer U. The audio/video content output system 1 includes a tiling display 10, a plurality of speaker units 20, and a control system 30.

The tiling display 10 includes a plurality of display units 12 arranged in a tile form. The tiling display 10 includes a single large screen SCR formed by one or more display units 12 that can be combined in a matrix. The display units 12 reproduce both video and audio. The tiling display 10 outputs a sound related to the video from the display units 12 that display the video. In the following description, a vertical direction is referred to as a height direction of the tiling display 10. An arrangement direction of the display units 12 orthogonal to the height direction is referred to as a width direction of the tiling display 10. A direction orthogonal to the height direction and the width direction is referred to as a depth direction of the tiling display 10.

A plurality of speaker units 20 are arranged around the tiling display 10. In the example of FIG. 1, a first array speaker 21, a second array speaker 22, and a subwoofer 23 are provided as the plurality of speaker units 20. The first array speaker 21 and the second array speaker 22 are line array speakers in which a plurality of speakers ASP (see FIG. 15) are arranged in a line. The first array speaker 21 is disposed along an upper side of the tiling display 10. The second array speaker 22 is disposed along a lower side of the tiling display 10. The plurality of speaker units 20 output a sound related to the display video together with the tiling display 10.

The control system 30 is an information processing apparatus that processes various types of information extracted from the content data CD. The control system 30 extracts one or more audio data AD (see FIG. 3) corresponding to different sound sources from the content data CD. The control system 30 acquires reproduction environment information 352 (see FIG. 3) about the configurations of the plurality of display units 12 and the plurality of speaker units 20 serving as a reproduction environment. The control system 30 performs rendering on the basis of the reproduction environment information 352 and maps each audio data AD to the reproduction environment.

Figure 2:
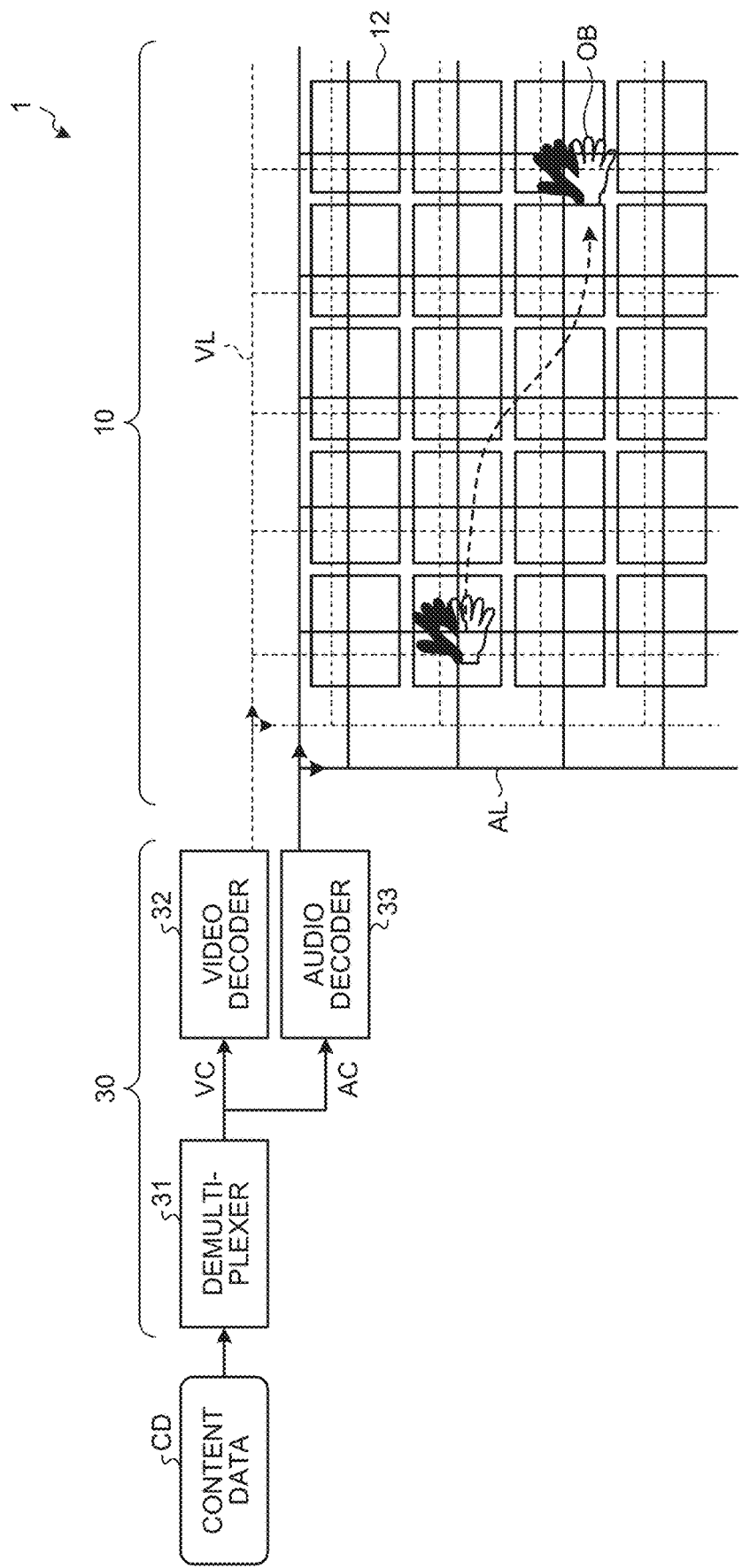
FIG. 2 is a diagram illustrating a configuration of a control system.

[1-2. Configuration of Control System]
FIG. 2 is a diagram illustrating a configuration of the control system 30.

The control system 30 includes a demultiplexer 31, a video decoder 32, and an audio decoder 33. The demultiplexer 31 acquires the content data CD from an external device. The content data CD includes information on video content VC and information on audio content AC. The demultiplexer 31 generates the video content VC and the audio content AC separately from the content data CD.

The video decoder 32 generates a video output signal from the video content VC, and outputs the video output signal to the plurality of display units 12 via a video output signal line VL. The audio decoder 33 extracts one or more audio data AD from the audio content AC. The audio decoder 33 maps each audio data AD to the plurality of display units 12 and the plurality of speaker units 20. The audio decoder 33 outputs an audio output signal generated on the basis of the mapping to the plurality of display units 12 and the plurality of speaker units 20 via an audio output signal line AL.

The control system 30 can handle the audio content AC of various types of channel-based audio, object-based audio, and scene-based audio. The control system 30 performs rendering processing on the audio content AC on the basis of the reproduction environment information 352. As a result, the audio data AD is mapped to the plurality of display units 12 and the plurality of speaker units 20 serving as the reproduction environment.

For example, the audio content AC of the channel-based audio includes one or more audio data AD generated for each channel. The control system 30 selects mapping destinations of the audio data AD of the channel other than the subwoofer 23 from the plurality of display units 12 and the plurality of speakers ASP on the basis of the arrangement of the channels.

The audio content AC of the object-based audio includes one or more audio data generated for each object (material sound), and meta information. The meta information includes information such as a position OB, a sound spread, and various effects for each object. The control system 30 selects mapping destinations of the audio data AD from the plurality of display units 12 and the plurality of speakers ASP on the basis of the position OB of the object defined in the meta information. The control system 30 changes the display units 12 as mapping destinations of the audio data AD of the object in accordance with the movement of the position OB of the object.

Scene-based audio is a system for recording and reproducing physical information of an entire space surrounding the viewer U in a 360° omnidirectional space. The audio content AC of the scene-based audio includes four audio data AD corresponding to channels of W (non-directional component), X (front-back spread component), Y (left-right spread component), and Z (up-down spread component). The control system 30 selects mapping destinations of the audio data AD from the plurality of display units 12 and the plurality of speakers ASP on the basis of the recorded physical information.

Figure 3:
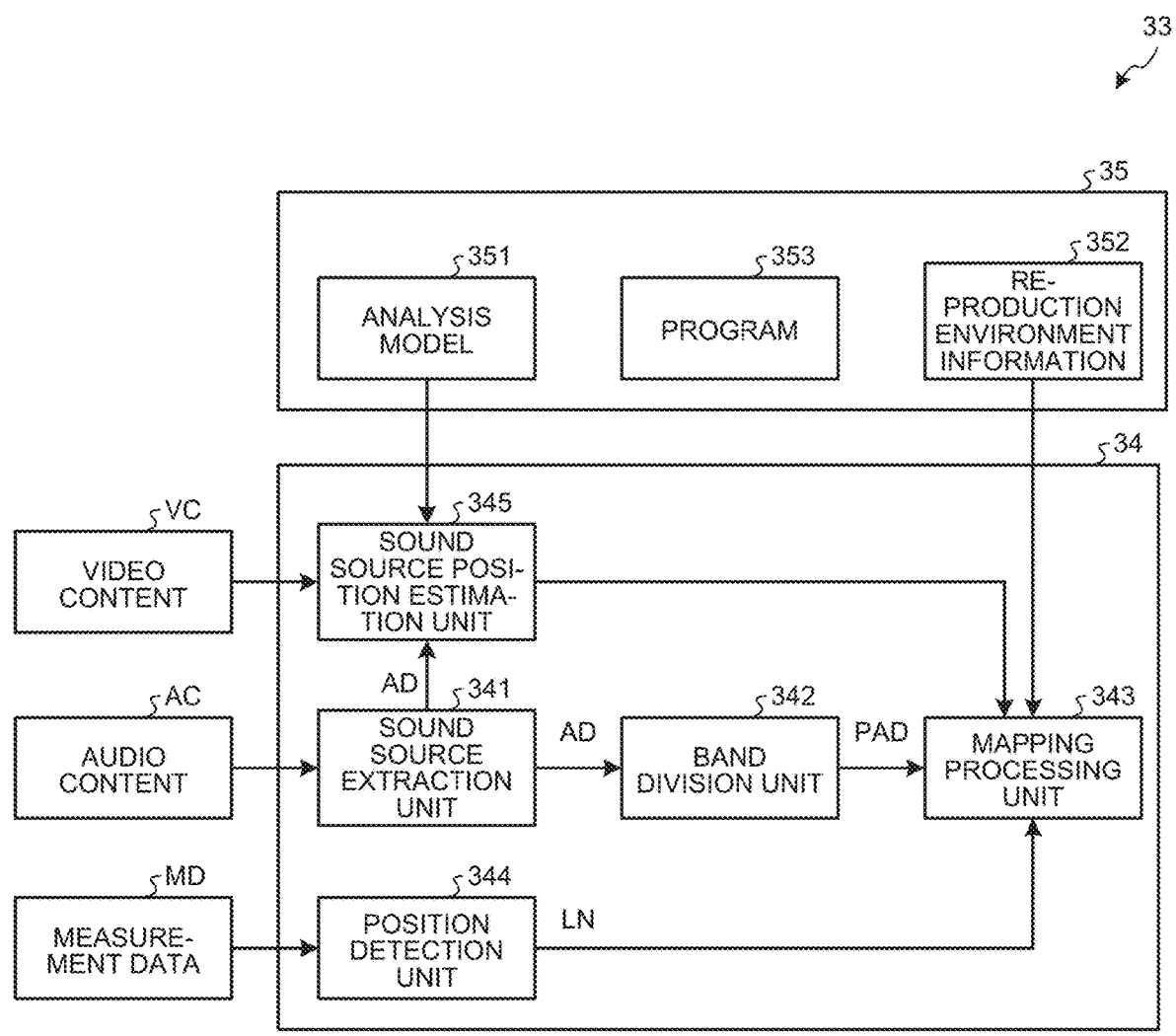
FIG. 3 is a diagram illustrating a configuration of an audio decoder.

FIG. 3 is a diagram illustrating a configuration of the audio decoder 33.

The audio decoder 33 includes a calculation unit 34 and a storage unit 35. The calculation unit 34 includes a sound source extraction unit 341, a band division unit 342, a mapping processing unit 343, a position detection unit 344, and a sound source position estimation unit 345.

The sound source extraction unit 341 extracts one or more audio data AD from the audio content AC. For example, the audio data AD is generated for each sound source. For example, one or more audio data AD generated for each channel serving as a sound source is extracted from the audio content AC of the channel-based audio. From the audio content AC of the object-based audio, one or more audio data AD generated for each object serving as a sound source is extracted.

The band division unit 342 divides the audio data AD for each frequency band. Band division processing is performed, for example, after a heavy bass component of the audio data AD is cut. The band division unit 342 outputs one or more pieces of waveform data PAD obtained by dividing the audio data AD to the mapping processing unit 343. The band division processing is performed on the audio data AD having a frequency component other than the heavy bass. The audio data AD of only the heavy bass is mapped from the sound source extraction unit 341 to the subwoofer 23 via the mapping processing unit 343.

The mapping processing unit 343 maps one or more pieces of waveform data PAD output from the band division unit 342 to the tiling display 10 (display units 12) and the plurality of speaker units 20 according to the frequency band.

The mapping processing unit 343 selects one or more display units 12 or one or more speakers ASP or one or more display units 12 and one or more speakers ASP to which the audio data AD is to be mapped for each audio data AD from the plurality of display units 12 and the plurality of speakers ASP.

For example, in a case where the audio data AD is audio data for a multichannel speaker extracted from the audio content AC of the channel-based audio, the mapping processing unit 343 selects one or more display units 12 or one or more speakers ASP determined by an arrangement of the multichannel speakers, or one or more display units 12 and one or more speakers ASP as mapping destinations.

In a case where the audio data AD is the audio data of the object extracted from the audio content AC of the object-based audio, the mapping processing unit 343 selects one or more display units 12 or one or more speakers ASP or one or more display units 12 and one or more speakers ASP corresponding to the position OB of the object extracted from the audio content AC as the mapping destinations.

The position detection unit 344 detects a spatial arrangement of the plurality of display units 12. The detection of the spatial arrangement is performed on the basis of measurement data MD such as sound or video output from the display units 12. The position detection unit 344 assigns a logical number LN to each of the display units 12 based on the detected spatial arrangement. The mapping processing unit 343 specifies the mapping destination on the basis of the logical number LN.

The sound source position estimation unit 345 estimates a position where the sound source of the audio data AD is displayed for each audio data AD. The sound source position estimation unit 345 is used to specify a position of the sound source in the video when the audio data AD having no position information of the sound source is input. The mapping processing unit 343 selects one or more display units 12 corresponding to a display position of the sound source as the mapping destinations.

For example, the sound source position estimation unit 345 applies the one or more audio data AD extracted by the sound source extraction unit 341 and the video content AC to an analysis model 351. The analysis model 351 is a deep neural network (DNN) engine that learns a relationship between the audio data AD and the position of the sound source in the video by machine learning. The sound source position estimation unit 345 estimates a position within the screen SCR where the sound source is displayed on the basis of an analysis result by the analysis model 351.

The storage unit 35 stores, for example, a program 353 executed by the calculation unit 34, the analysis model 351, and the reproduction environment information 352. The program 353 is a program that causes a computer to execute information processing performed by the control system 30. The calculation unit 34 performs various processing according to the program 353 stored in the storage unit 35. The storage unit 35 may be used as a work area for temporarily storing a processing result of the calculation unit 34. The storage unit 35 includes, for example, an arbitrary non-transitory storage medium such as a semiconductor storage medium and a magnetic storage medium. The storage unit 35 includes, for example, an optical disk, a magneto-optical disk, or a flash memory. The program 353 is stored in, for example, a non-transitory computer-readable storage medium.

The calculation unit 34 is, for example, a computer including a processor and a memory. The memory of the calculation unit 34 includes a random access memory (RAM) and a read only memory (ROM). The calculation unit 34 functions as the sound source extraction unit 341, the band division unit 342, the mapping processing unit 343, the position detection unit 344, and the sound source position estimation unit 345 by executing the program 353.

[1-3. Configuration and Arrangement Form of Display Units]

Figure 4:
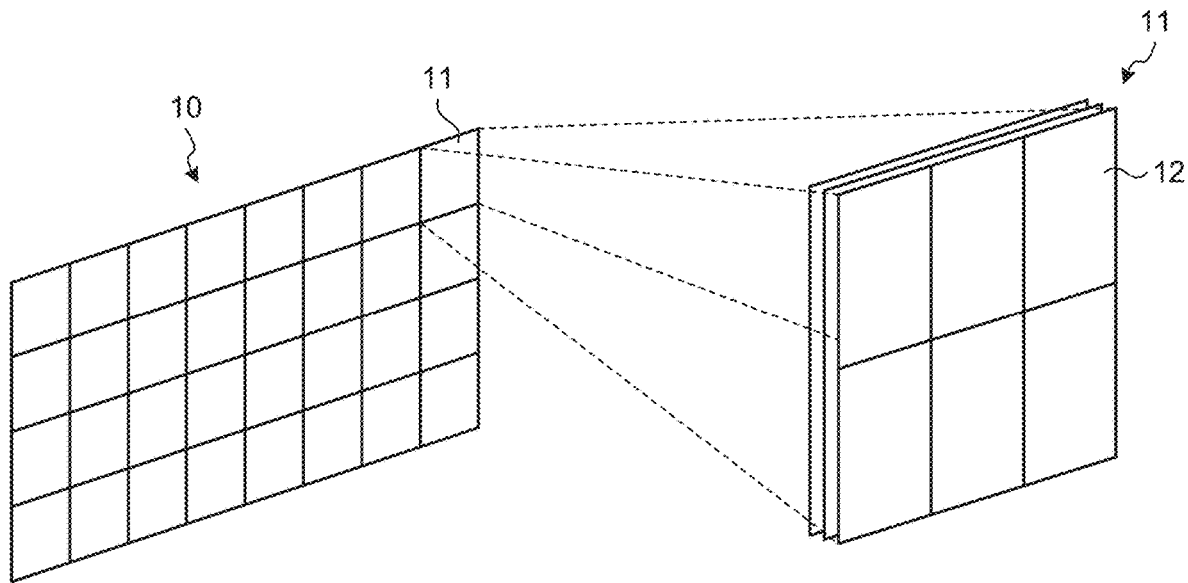
FIG. 4 is a diagram illustrating a schematic configuration of a tiling display.

FIG. 4 is a diagram illustrating a schematic configuration of the tiling display 10.

The tiling display 10 includes a plurality of cabinets 11 combined in a tiled manner. The plurality of display units 12 are attached to the cabinets 11 in a state of being arranged in a tile shape. There is no region serving as a frame on an outer peripheral part of the display units 12. Pixels of the plurality of display units 12 are continuously arranged across a boundary part of the display units 12 while maintaining a pixel pitch. As a result, the tiling display 10 including the single screen SCR spanning the plurality of display units 12 is formed.

The number and arrangement of the display units 12 attached to one of the cabinets 11 are arbitrary. The number and arrangement of the cabinets 11 constituting the tiling display 10 are also arbitrary. For example, in the example of FIG. 4, a total of 32 cabinets of four rows in the height direction and eight rows in the width direction are two-dimensionally arranged. A total of six display units 12 of two rows in the height direction and three rows in the width direction are attached to one of the cabinets 11. Therefore, the tiling display 10 includes a total of 192 display units 12 including 8 rows in the height direction and 24 rows in the width direction.

Figure 5:
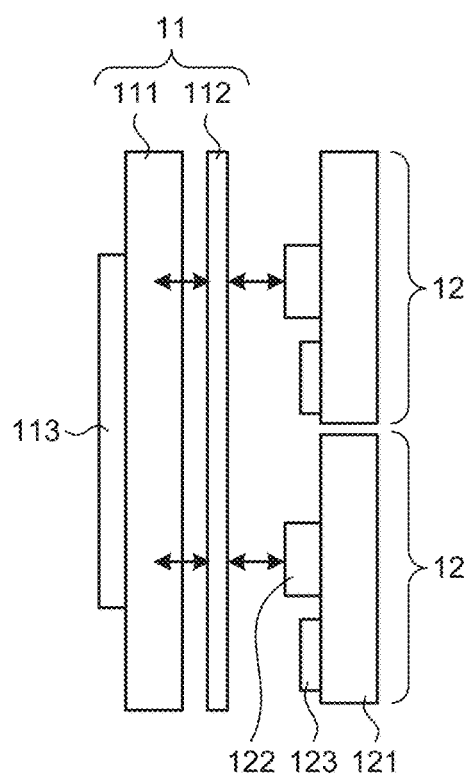
FIG. 5 is a diagram illustrating an example of a configuration and arrangement of display units.

FIG. 5 is a diagram illustrating an example of the configuration and arrangement of the display units 12.

Each of the display units 12 includes a display panel 121, an actuator 122, and a control circuit 123. The display panel 121 is a self-luminous thin display panel including no backlight. In the present embodiment, as the display panel 121, an LED panel in which three types of micro light emitting diodes (LEDs) of red, green, and blue are arranged for each pixel is used. The actuator 122 vibrates the display panel 121 to output a sound from a surface of the display panel 121. The control circuit 123 includes a pixel drive circuit that drives a pixel and an actuator drive circuit that drives the actuator 122. The actuator 122 and the actuator drive circuit function as a sound producing mechanism for generating a sound from the display unit 12.

Each of the cabinets 11 includes a housing 111, a connection board 112, and a cabinet board 113. The connection board 112 is a board that connects the control circuit 123 and the cabinet board 113. The connection board 112 is fixed to the housing 111. The display panel 121 is fixed to the connection board 112 by screwing or the like. Accordingly, each of the display units 12 is supported by each of the cabinets 11. The cabinet board 113 is connected to the control system 30. The control system 30 outputs a video output signal and an audio output signal to the control circuit 123 via the cabinet board 113.

Figure 6:
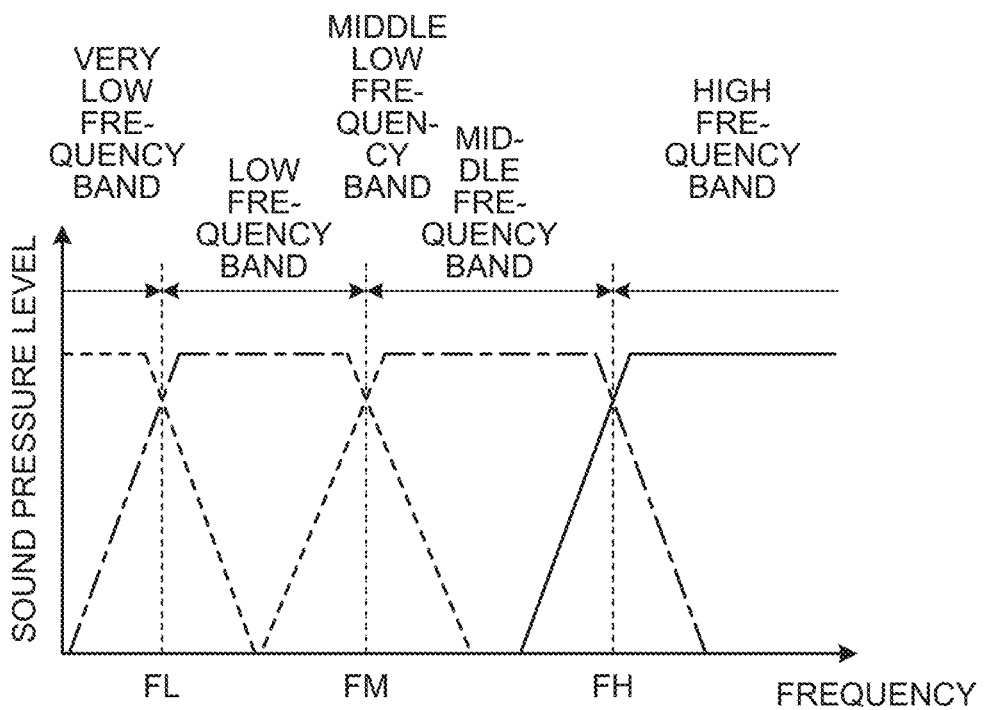
FIG. 6 is an explanatory diagram of reproduction frequency of a tiling display and speaker units.
Figure 7:
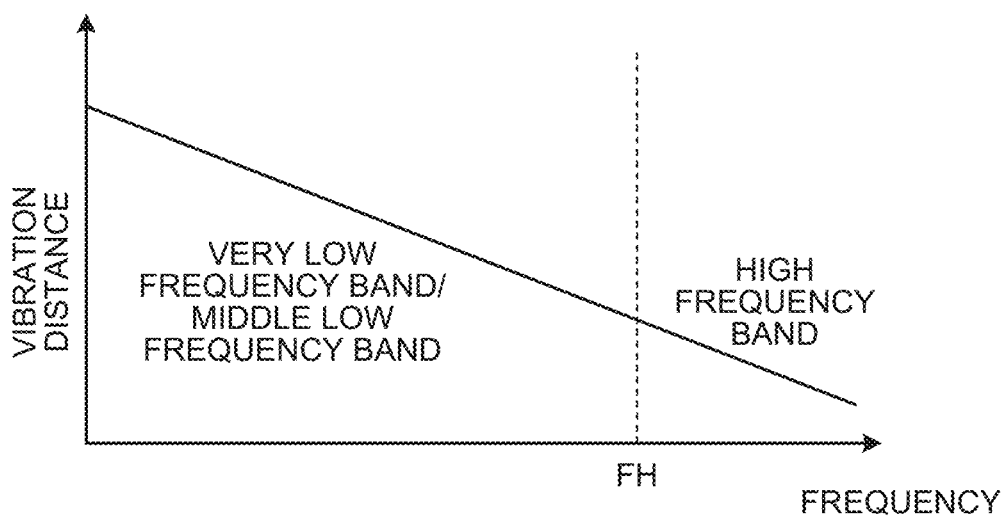
FIG. 7 is a diagram illustrating a relationship between a reproduction frequency of display units and a magnitude of vibration during reproduction.

FIG. 6 is an explanatory diagram of reproduction frequencies of the tiling display 10 and the speaker units 20. FIG. 7 is a diagram illustrating a relationship between a reproduction frequency of the display units 12 and a magnitude of vibration during reproduction.

A sound associated with a display video of the tiling display 10 is reproduced by the tiling display 10 (display units 12) and the plurality of speaker units 20. As illustrated in FIG. 6, a reproduction frequency band is classified into four bands of a high frequency band HF, a middle frequency band MF, a low frequency band LF, and a very low frequency band VLF (heavy low frequency sound). The high frequency band HF is a frequency band higher than or equal to a first frequency FH. The middle frequency band MF is a frequency band higher than or equal to a second frequency FM and lower than the first frequency FH. The low frequency band LF is a frequency band higher than or equal to a third frequency FL and lower than the second frequency FM. The very low frequency band VLF is a frequency band lower than the third frequency FL. For example, the first frequency FH is 1 kHz. The second frequency FM is 500 Hz. The third frequency FL is 100 Hz.

The band division unit 342 divides the audio data AD into three waveform data PAD of a high frequency band HF, a middle frequency band MF, and a low frequency band LF. The waveform data of the very low frequency band VLF is divided by the band division unit 342. The mapping processing unit 343 maps the waveform data PAD of the high frequency band HF, the middle frequency band MF, and the low frequency band LF to the display units 12 or the speakers ASP.

The sound image localization ability for sensing a position of a sound image varies depending on a frequency of a sound. The higher the frequency, the higher the sound image localization ability. Therefore, the mapping processing unit 343 maps the waveform data PAD of the high frequency band HF having the highest frequency among the audio data AD to one or more display units 12 to serve mapping destinations. By outputting a sound of the high frequency band HF having high sound image localization ability from the display units 12, a shift is less likely to occur between a position of the sound source and a position of the sound image.

As illustrated in FIG. 7, when the reproduction frequency of the display units 12 decreases, a vibration amount of the display units 12 increases. Therefore, when a sound with a low frequency is reproduced by the display units 12, there is a possibility that the viewer U recognizes the shake of the video due to vibration. Therefore, the mapping processing unit 343 maps the waveform data PAD of the middle frequency band MF and the low frequency band LF (middle low frequency) to the first array speaker 21 and the second array speaker 22.

For example, the mapping processing unit 343 selects one or more speakers ASP corresponding to the position of the sound source of the audio data AD from the plurality of speakers ASP arranged around the tiling display 10. The mapping processing unit 343 maps the waveform data PAD of the low frequency band LF having the lowest frequency among the audio data AD and the waveform data PAD of the middle frequency band MF between the high frequency band HF and the low frequency band LF to the selected one or more speakers ASP.

A magnitude of the vibration of the display units 12 varies depending on a sound pressure (volume) of the reproduced sound. When the sound pressure is large, the vibration is large, and when the sound pressure is small, the vibration is small. Therefore, even in the case of the waveform data PAD of a middle low frequency, the mapping processing unit 343 can map the waveform data PAD of the middle low frequency on the display units 12 when the sound pressure is small. For example, in a case where an amplitude of the waveform data PAD of the middle frequency band MF having a large sound image localization ability among the waveform data PAD of the middle low frequency band is less than or equal to a preset threshold value, the mapping processing unit 343 maps the waveform data PAD of the middle frequency band MF to the display units 12. As a result, it is possible to enhance the sound image localization ability while suppressing the shake of the image due to the vibration of the display units 12.

Even when the sound pressure is high, the magnitude of vibration of the display units 12 per sheet can be reduced by increasing the number of display units 12 to be vibrated. Therefore, the mapping processing unit 343 makes the number of the display units 12 to which waveform data PAD of middle frequency band MF is mapped larger than the number of display units 12 to which waveform data PAD of high frequency band HF is mapped. Even with this configuration, it is possible to enhance the sound image localization ability while suppressing the shake of the image due to the vibration of the display units 12.

[1-4. Logical Number of Display Units]

Figure 8:
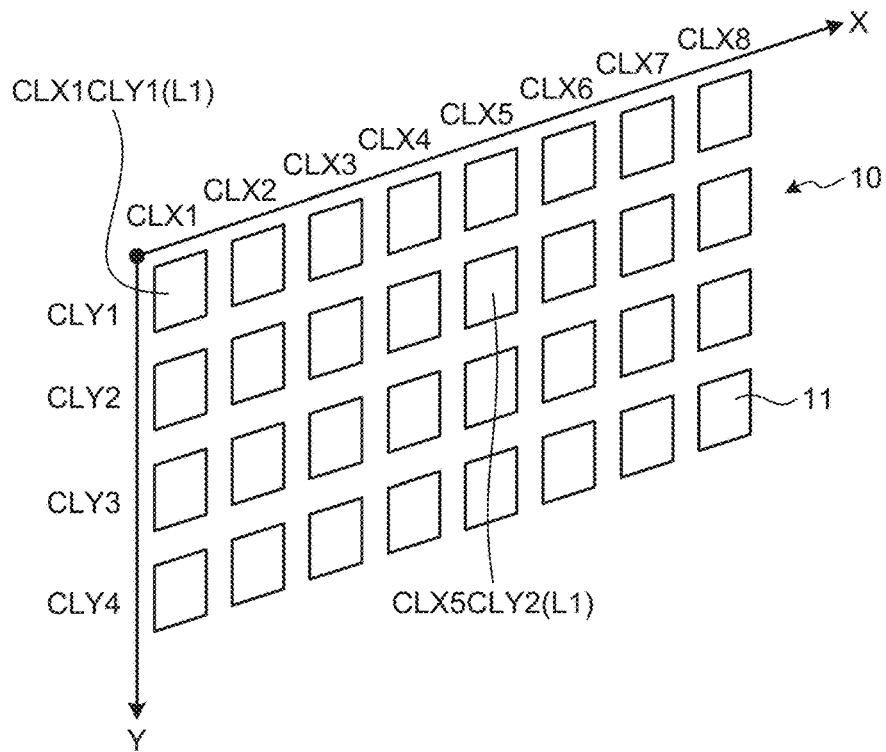
FIG. 8 is a diagram for explaining logical numbers of display units.
Figure 9:
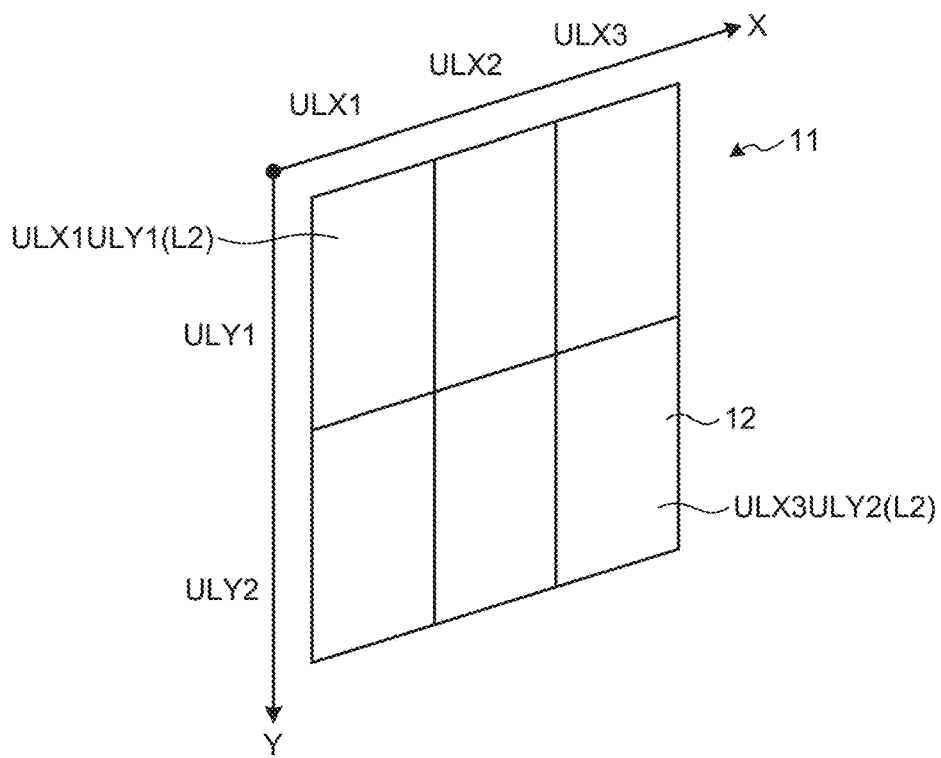
FIG. 9 is a diagram for explaining the logical numbers of the display units.
Figure 10:
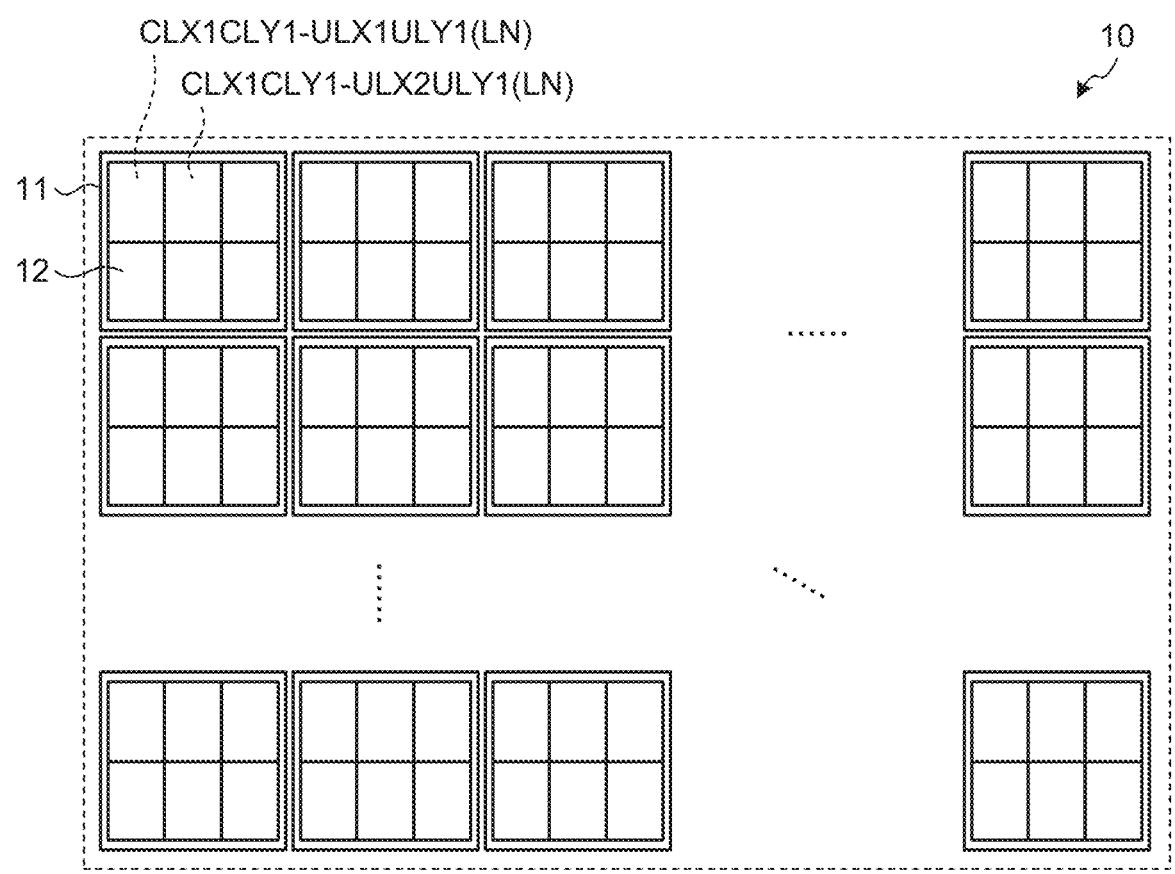
FIG. 10 is a diagram for explaining the logical numbers of the display units.

FIGS. 8 to 10 are diagrams illustrating logical numbers of the display units 12.

As illustrated in FIG. 8, a plurality of cabinets 11 is provided with a logical number L1 based on the position of each of the cabinets 11. In the example of FIG. 8, XY coordinates in which the width direction is an X direction and the height direction is a Y direction are set. In each cabinet 11, the logical number L1 is set based on a position on each of the XY coordinates. For example, the logical number L1 of "CLX1CLY1" is assigned to the cabinet 11 positioned in the first row and the first column. The logical number L1 of "CLX5CLY2" is assigned to the cabinet 11 positioned in the second column and the fifth row.

As illustrated in FIG. 9, the plurality of display units 12 are attached to one of the cabinets 11. The plurality of display units 12 attached to the same cabinet 11 is provided with a logical number L2 based on respective positions in the cabinet 11. For example, the logical number L2 of "ULX1ULY1" is assigned to the display unit 12 positioned in the first row and the first column of the cabinet 11. The logical number L2 of "ULX3ULY2" is assigned to the display unit 12 positioned in the second column and the third row of the cabinet 11.

As illustrated in FIG. 10, a logical number LN is assigned to each display unit 12 based on a position of the cabinet 11 to which the display units 12 belong and the positions of the display units 12 in cabinet 11. For example, the logical number LN of "CLX1CLY1-ULX1ULY1" is assigned to the display unit 12 in the first row and the first column in the cabinet 11 in the first row and the first column. The logical number LN of "CLX1CLY1-ULX2ULY1" is assigned to the display unit 12 in the first row and the second column in the cabinet 11 in the first row and the first column.

[1-5. Connection Form Between Cabinet and Control System]

Figure 11:
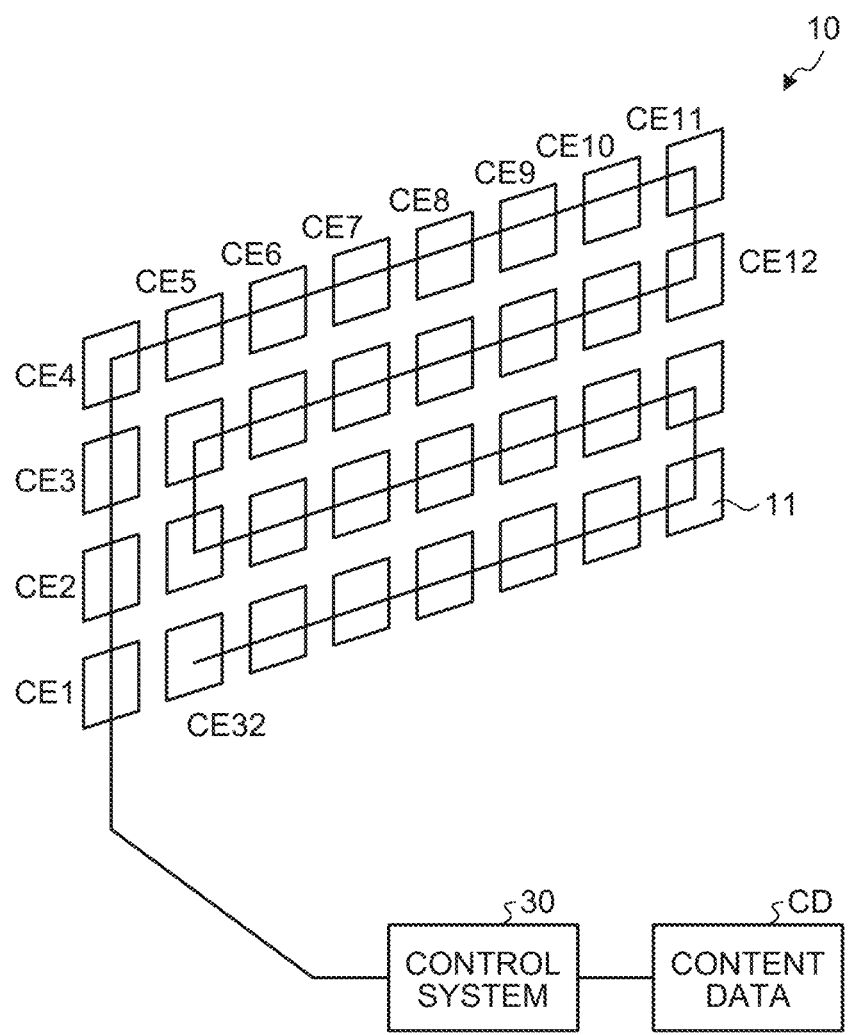
FIG. 11 is a diagram illustrating an example of a connection form between cabinets and a control system.
Figure 12:
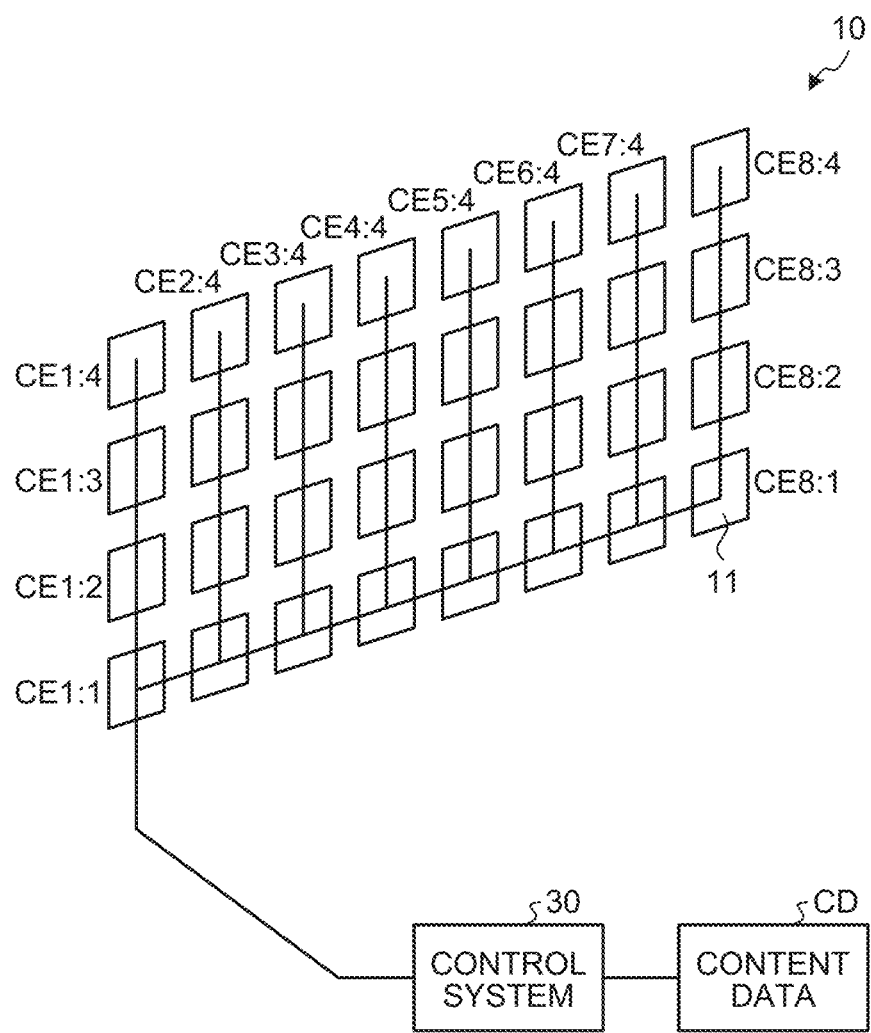
FIG. 12 is a diagram illustrating an example of a connection form between the cabinets and the control system.

FIGS. 11 and 12 are diagrams illustrating an example of a connection form between the cabinets 11 and the control system 30.

The plurality of cabinets 11 are connected to the control system 30 by serial connection, parallel connection, or a combination thereof. For example, in the example of FIG. 11, the plurality of cabinets 11 are serially connected to the control system 30. The two adjacent cabinets 11 are connected by connecting the cabinet boards 113 to each other. The plurality of cabinets 11 are provided with cabinet connection numbers CEk (k is an integer from 1 to 32). The control system 30 outputs a video output signal and an audio output signal to the plurality of cabinets 11 according to the cabinet connection number.

In the example of FIG. 12, the plurality of cabinets 11 are connected to the control system 30 by a combined serial connection and parallel connection. The plurality of cabinets 11 include cabinet connection numbers CEl,m (l is an integer from 1 to 8. m is an integer from 1 to 4. The control system 30 outputs a video output signal and an audio output signal to the plurality of cabinets 11 according to the cabinet connection number.

[1-6. Connection Form Between Cabinet and Display Units]

Figure 13:
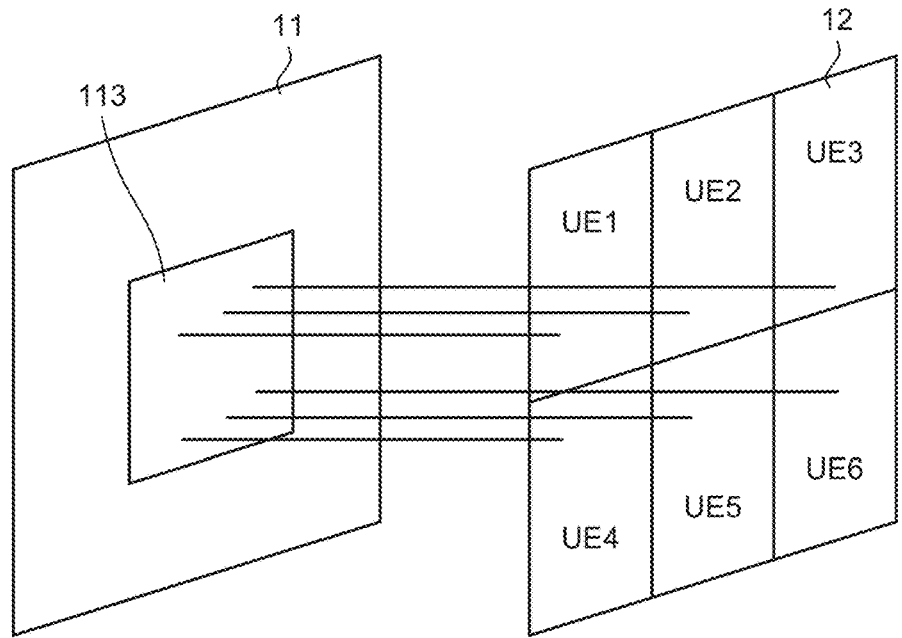
FIG. 13 is a diagram illustrating an example of a connection form between a cabinet and display units.

FIG. 13 is a diagram illustrating an example of a connection form between the cabinet 11 and the display units 12.

The plurality of display units 12 supported by the same cabinet 11 are connected in parallel to the cabinet board 113. The plurality of display units 12 are electrically connected to the control system 30 via the cabinet board 113. Unit connection numbers UE1 to UE6 are attached to the plurality of display units 12. A video output signal and an audio output signal are output from the cabinet board 113 to the plurality of display units 12 according to the unit connection number.

2. First Embodiment

[2-1. Image of System]

Figure 14:
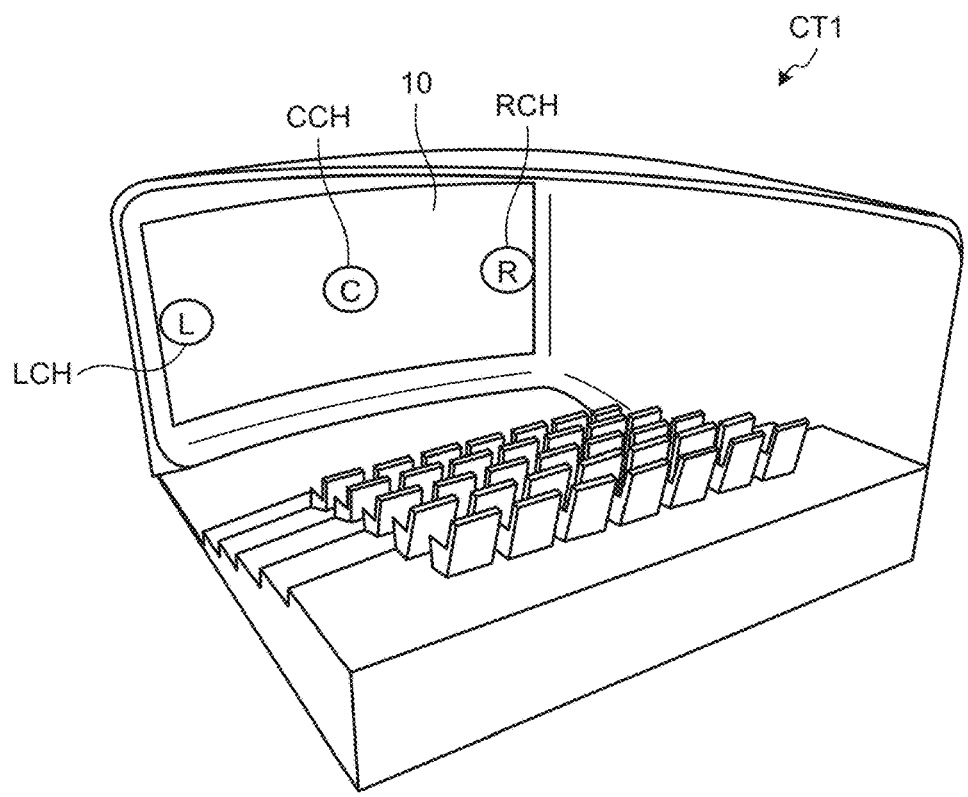
FIG. 14 is a diagram illustrating an example in which an audio/video content output system is applied to a theater.

FIG. 14 is a diagram illustrating an example in which an audio/video content output system 1 is applied to a theater CT1.

In the theater CT1, audio content AC of channel-based audio is used. FIG. 14 virtually illustrates positions of a multichannel speakers of a left channel LCH, a center channel CCH, and a right channel RCH.

In the theater using a sound screen, a multichannel speaker is arranged on a back surface of the sound screen. The sound screen is provided with a large number of minute sound holes. The audio output from the multichannel speaker is output to a viewer side (a front side of the sound screen) via the sound holes.

However, a plurality of display units 12 are laid on tiling display 10 without any gap. Therefore, a hole such as a sound hole cannot be provided in tiling display 10. A method of generating a phantom sound image by arranging a multichannel speaker around the tiling display 10 is also conceivable, but in this method, a range of a viewing position where the sound image is correctly localized is narrow.

Therefore, in the theater CT1, the audio data AD of the left channel LCH, the center channel CCH, and the right channel RCH are mapped to the tiling display 10 (display units 12). By directly reproducing the audio data AD for the multichannel speaker on a screen SCR, a sense of unity between a video and an audio like a sound screen is realized.

[2-2. Mapping Processing of Audio Data of Channel-Based Audio]

Figure 15:
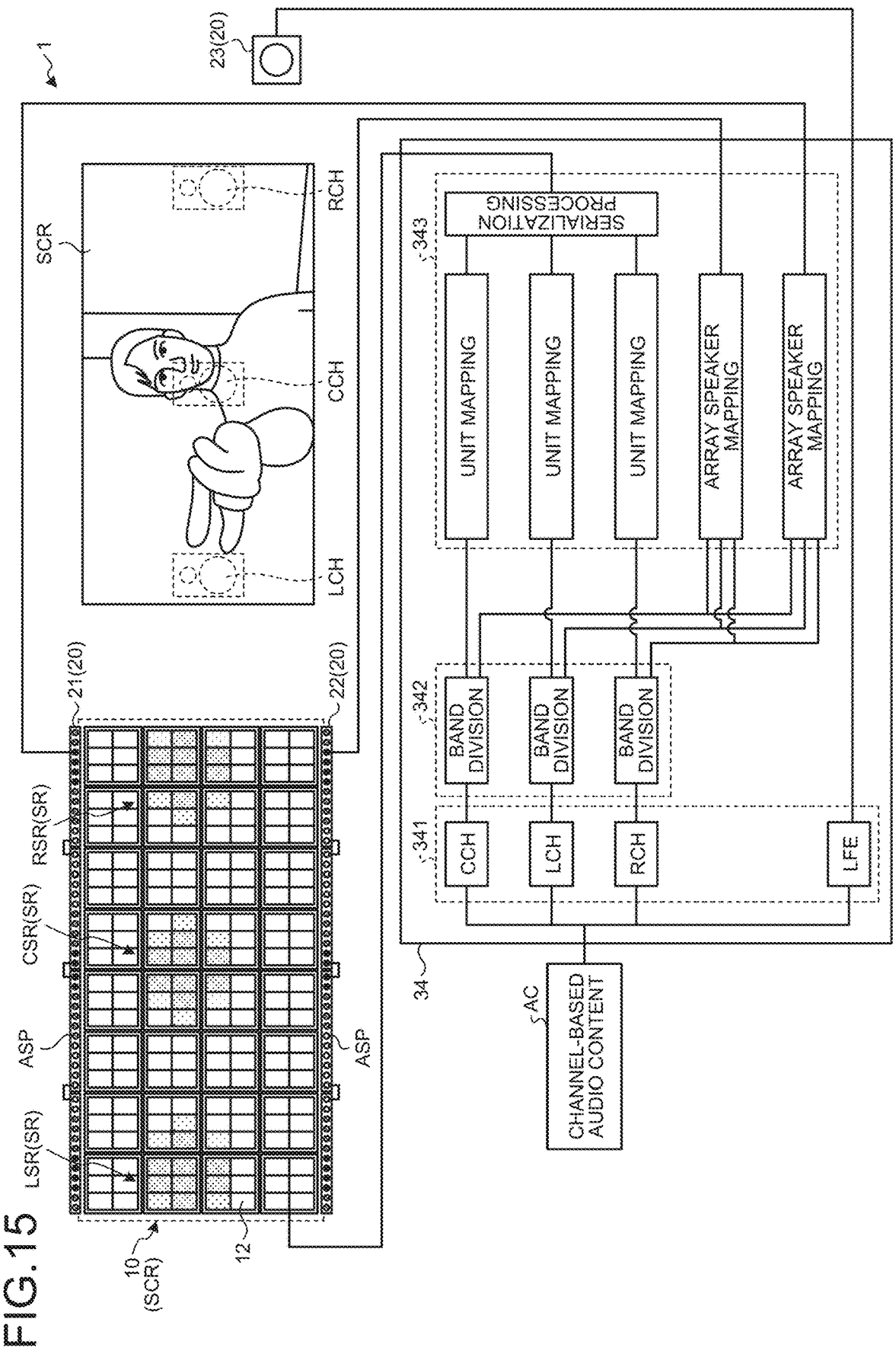
FIG. 15 is a diagram illustrating an example of mapping processing of audio data of channel-based audio.

FIG. 15 is a diagram illustrating an example of mapping processing of audio data AD of channel-based audio.

The audio content AC of channel-based audio is input to a calculation unit 34. The audio content AC includes one or more audio data AD generated for each channel. A sound source extraction unit 341 extracts the audio data AD for each channel serving as a sound source from the audio content AC. In the example of FIG. 15, four audio data AD corresponding to the left channel LCH, the center channel CCH, the right channel RCH, and a low sound enhancement channel LFE are extracted.

A sound in a frequency band from a high frequency band HF to a low frequency band LF is allocated to the audio data AD of the left channel LCH, the center channel CCH, and the right channel RCH. A sound in a frequency band of a very low frequency band VLF is allocated to the audio data AD of the low sound enhancement channel LFE. The sound source extraction unit 341 outputs the audio data AD of the left channel LCH, the center channel CCH, and the right channel RCH to a band division unit 342. The sound source extraction unit 341 outputs the audio data AD of the low sound enhancement channel LFE to a subwoofer 23.

The band division unit 342 divides the audio data AD of channels (the left channel LCH, the center channel CCH, the right channel RCH) other than the low sound enhancement channel LFE for each frequency band. For example, the band division unit 342 divides the audio data AD of each of the left channel LCH, the center channel CCH, and the right channel RCH into waveform data PAD of the high frequency band HF and waveform data of the middle low frequency band, and outputs the divided data to a mapping processing unit 343.

The mapping processing unit 343 maps the waveform data PAD of the high frequency band HF and the meddle low frequency band extracted from the audio data AD of each channel to one or more display units 12 and one or more speakers ASP determined by a position of the multichannel speaker. The position of the multichannel speaker is extracted from the reproduction environment information 352. In the reproduction environment information 352, for example, coordinates on the screen SCR where a central part of the multichannel speaker is located are defined as the position of the multichannel speaker. The mapping processing unit 343 extracts a predetermined region on the screen SCR centered on the coordinates as a sound source region SR.

For example, the mapping processing unit 343 extracts a sound source region LSR of the left channel LCH, a sound source region CSR of the center channel CCH, and a sound source region RSR of the right channel RCH as the sound source regions SR of the respective channels from the reproduction environment information 352. In the example of FIG. 15, regions indicated by dark hatching (In the example of FIG. 15, regions extending over 8 display units 12) are extracted as the sound source regions SR.

The mapping processing unit 343 maps the waveform data PAD of the high frequency band HF of the left channel LCH to one or more display units 12 arranged in the sound source region LSR of the left channel LCH. The mapping processing unit 343 maps the waveform data PAD of the middle low frequency band of the left channel LCH to one or more speakers ASP arranged at the same position on the X axis as the sound source region LSR of the left channel LCH.

In a case where a sound pressure in the high frequency band HF of the left channel LCH is large, if the set sound pressure is to be realized only by the display units 12 arranged in the sound source region LSR, vibration of each display unit 12 becomes large. When the vibration of the display units 12 increases, there is a possibility that the viewer U recognizes the shake of the video.

Therefore, the mapping processing unit 343 enlarges the mapping destination around the sound source region LSR. The mapping processing unit 343 also maps the waveform data PAD to one or more display units 12 (in the example of FIG. 15, five display units 12 indicated by thin hatching) arranged around the sound source region LSR. The mapping processing unit 343 also expands the mapping destinations of the waveform data PAD of the middle low frequency band in accordance with the expansion of the mapping destinations of the waveform data PAD of the high frequency band HF. As a result, a shift is less likely to occur between a sound image of the high frequency band HF and a sound image of the middle low frequency band.

The waveform data PAD of the center channel CCH and the right channel RCH is also mapped by the same method.

That is, the mapping processing unit 343 maps the waveform data PAD of the high frequency band HF of the center channel CCH to one or more display units 12 arranged in the sound source region CSR of the center channel CCH. The mapping processing unit 343 maps the waveform data PAD of the middle low frequency band of the center channel CCH to one or more speakers ASP arranged at the same position on the X-axis as the sound source region CSR. When a sound pressure in the high frequency band HF of the left channel LCH is high, the mapping processing unit 343 enlarges the mapping destinations around the sound source region CSR. The mapping processing unit 343 also expands the mapping destinations of the waveform data PAD of the middle low frequency band in accordance with the expansion of the mapping destinations of the waveform data PAD of the high frequency band HF.

The mapping processing unit 343 maps the waveform data PAD of the high frequency band HF of the right channel RCH to one or more display units 12 arranged in the sound source region RSR of the right channel RCH. The mapping processing unit 343 maps the waveform data PAD of the middle low frequency band of the right channel RCH to one or more speakers ASP arranged at the same position on the X-axis as the sound source region RSR. In a case where a sound pressure in the high frequency band HF of the right channel RCH is large, the mapping processing unit 343 expands the mapping destinations around the sound source region RSR. The mapping processing unit 343 also expands the mapping destinations of the waveform data PAD of the middle low frequency band in accordance with the expansion of the mapping destinations of the waveform data PAD of the high frequency band HF.

The mapping processing unit 343 performs serialization processing on the waveform data PAD mapped to each display unit 12. The mapping processing unit 343 outputs an audio output signal for the display units 12 generated by the serialization processing to the tiling display 10. The mapping processing unit 343 generates a sound output signal for the speakers ASP based on the waveform data PAD mapped to each speaker ASP, and outputs the sound output signal to a first array speaker 21 and a second array speaker 22.

[2-3. Mapping Processing of Audio Data of Object-Based Audio]

Figure 16:
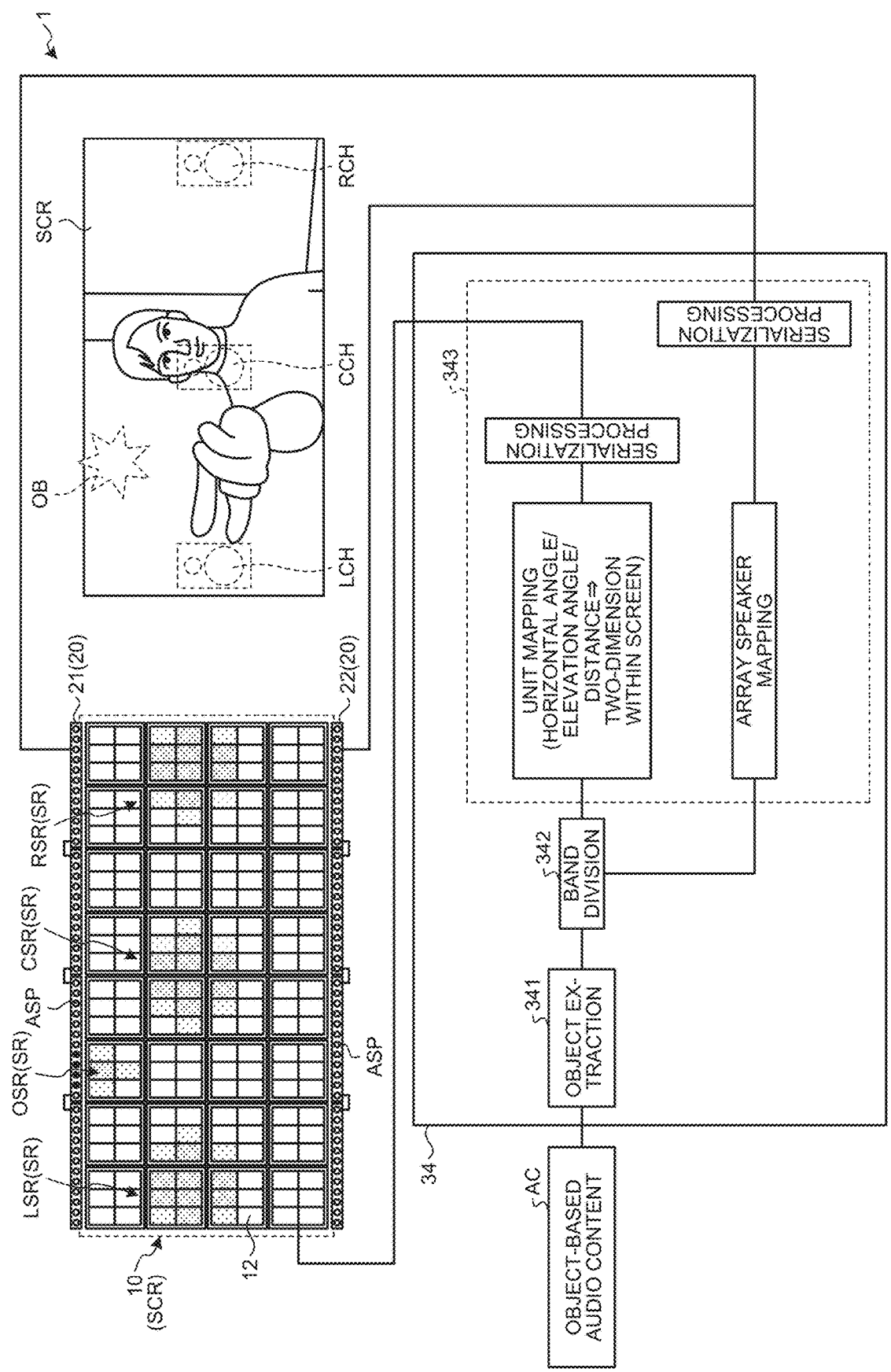
FIG. 16 is a diagram illustrating an example of mapping processing of audio data of object-based audio.
Figure 17:
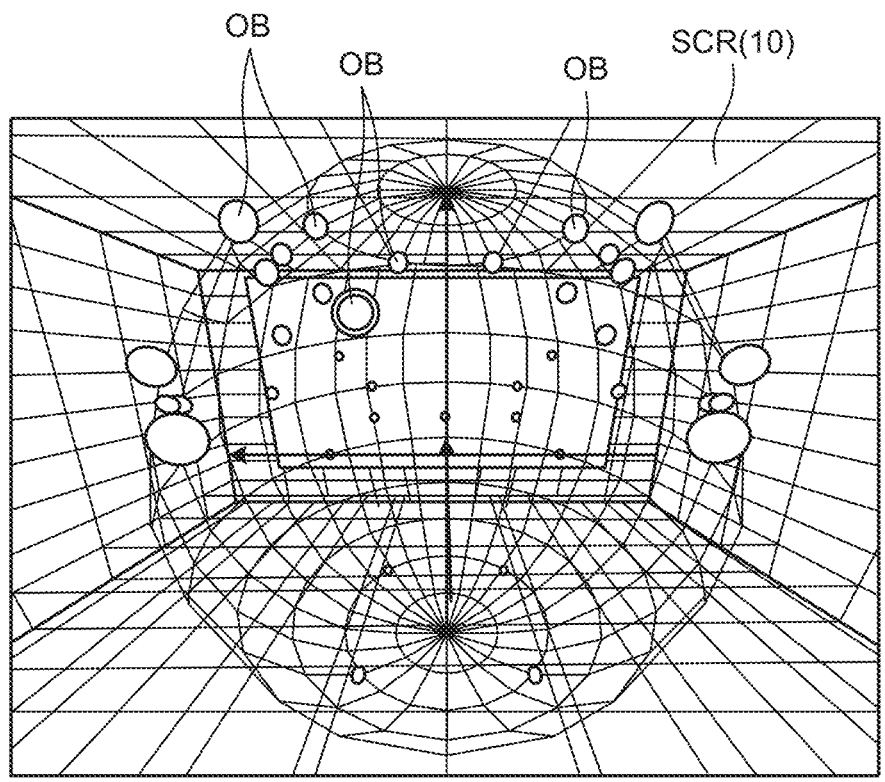
FIG. 17 is a diagram illustrating an example of mapping processing of audio data of object-based audio.

FIGS. 16 and 17 are diagrams illustrating an example of mapping processing of audio data AD of object-based audio.

As illustrated in FIG. 16, the audio content AC of object-based audio is input to the calculation unit 34. The audio content AC includes one or more audio data AD generated for each object. The sound source extraction unit 341 extracts the audio data AD for each object serving as a sound source from the audio content AC.

In the example of FIG. 16, a video in which a character flicks the finger is displayed on the screen SCR. The audio content AC includes audio data AD of a sound (object) of snapping the finger and meta information indicating a position (position OB of the object) of snapping the finger. In the example of FIG. 16, the number of objects is one, but the number of objects is not limited to one. As illustrated in FIG. 17, different objects may be arranged at a plurality of the positions OB. In this case, the sound source extraction unit 341 extracts a plurality of audio data AD corresponding to different objects from the audio content AC.

The band division unit 342 divides the waveform data of the audio data AD higher than or equal to the low frequency band LF for each frequency band. For example, the band division unit 342 divides the audio data AD of the object into the waveform data PAD of the high frequency band HF and the waveform data of the middle low frequency band, and outputs the divided data to the mapping processing unit 343.

The mapping processing unit 343 maps the waveform data PAD of the high frequency band HF and the middle low frequency band extracted from the audio data AD of the object to one or more display units 12 and one or more speakers ASP corresponding to the position OB of the object. The position OB of the object is defined in the meta information as, for example, information of a horizontal angle, an elevation angle, and a distance from a preset viewing position. The mapping processing unit 343 extracts a predetermined region on the screen SCR centered on the position OB as a sound source region OSR. In the example of FIG. 16, the sound source region OSR is extracted as a region having a size corresponding to one display unit 12 indicated by dark hatching.

Note that FIG. 16 illustrates a state in which the sound source regions LSR, CSR, and RSR of the respective channels and the sound source region OSR of the object are simultaneously present as the sound source regions SR.

The mapping processing unit 343 maps the waveform data PAD of the high frequency band HF of the object to one or more display units 12 arranged in the sound source region SR of the object. The mapping processing unit 343 maps the waveform data PAD of the middle low frequency band of the object to one or more speakers ASP arranged at the same position on the X-axis as the sound source region OSR of the object.

When a sound pressure in the high frequency band HF of the object is high, the mapping processing unit 343 enlarges the mapping destinations around the sound source region SR (in the example of FIG. 16, three display units 12 indicated by thin hatching). The mapping processing unit 343 also expands the mapping destinations of the waveform data PAD of the middle low frequency band in accordance with the expansion of the mapping destinations of the waveform data PAD of the high frequency band HF.

The mapping processing unit 343 performs serialization processing on the waveform data PAD mapped to each display unit 12. The mapping processing unit 343 outputs an audio output signal for the display units 12 generated by the serialization processing to the tiling display 10. The mapping processing unit 343 performs serialization processing on the waveform data PAD mapped to each speaker ASP. The mapping processing unit 343 outputs an audio output signal for the speakers ASP generated by the serialization processing to the first array speaker 21 and the second array speaker 22.

[2-4. Sound Source Arrangement Using DNN Engine]

Figure 18:
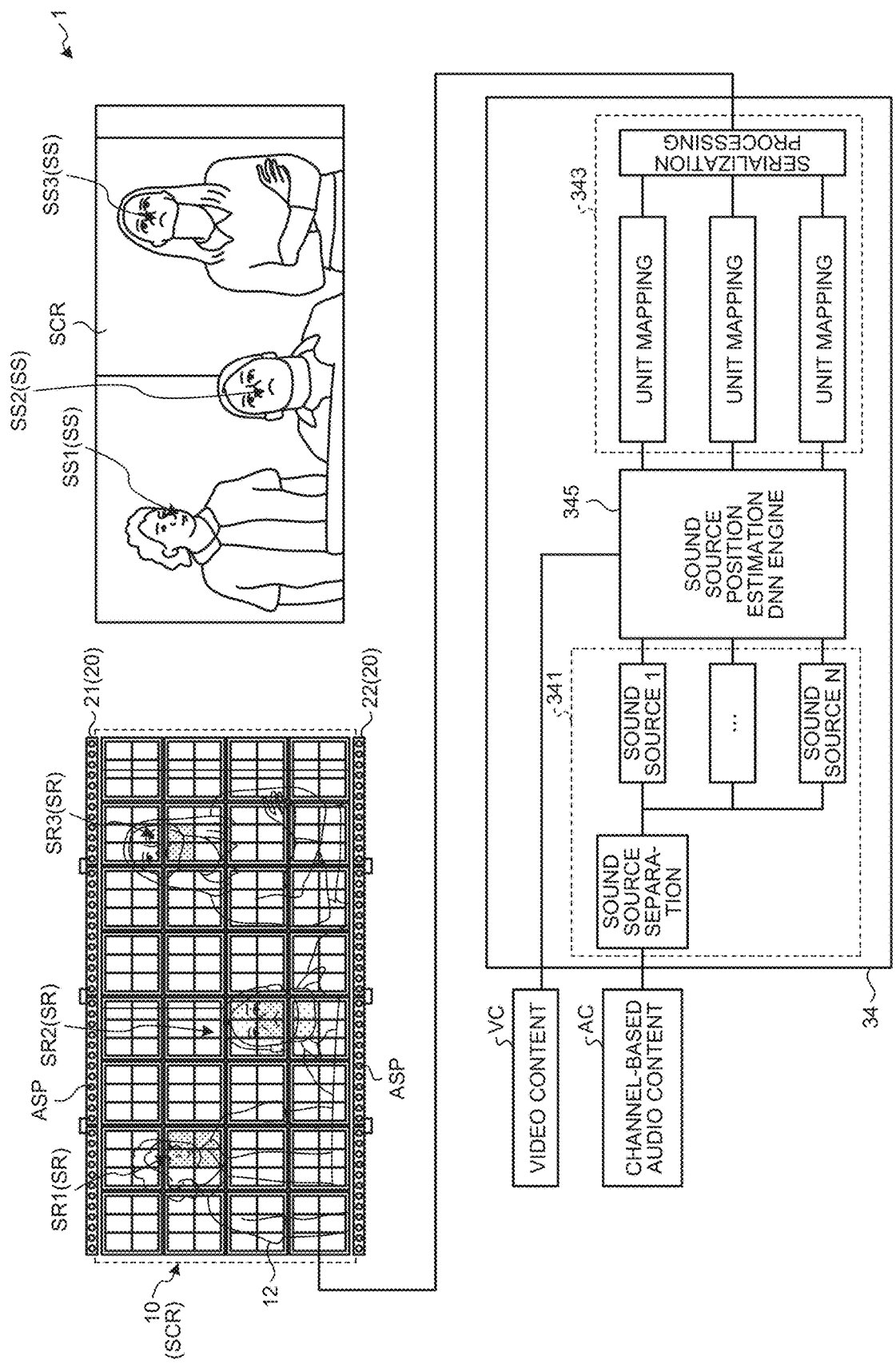
FIG. 18 is a diagram illustrating another example of the mapping processing of audio data of channel-based audio.

FIG. 18 is a diagram illustrating another example of the mapping processing of the audio data AD of the channel-based audio.

The audio content AC of channel-based audio is input to a calculation unit 34. The sound source extraction unit 341 extracts the audio data AD for each sound source SS from the audio content AC using a sound source separation technology. As the sound source separation technology, a known sound source separation technology such as blind signal source separation is used. In the example of FIG. 18, each character appearing on the screen SCR is the sound source SS. The sound source extraction unit 341 extracts the spoken voice of the character as the sound source SS as the audio data AD for each sound source SS. Note that, in the example of FIG. 18, a sound source SS1, a sound source SS2, and a sound source SS3 are extracted as the sound sources SS. However, the number N of the sound sources SS is not limited thereto. The number N of the sound sources SS can be an arbitrary number of one or more.

Positions of the sound sources SS are estimated by a sound source position estimation unit 345. The sound source position estimation unit 345 applies one or more audio data AD extracted by the sound source extraction unit 341 and the video content AC to an analysis model 351 using a DNN engine, for example. Based on an analysis result by the analysis model 351, the sound source extraction unit 341 estimates, for each sound source SS, the positions on the screen SCR on which the sound sources SS are displayed as sound source regions SR.

The mapping processing unit 343 maps the audio data AD of the sound sources SS to one or more display units 12 arranged at the positions of the sound sources SS for each sound source SS. The mapping processing unit 343 performs the serialization processing on the audio data AD of each sound source SS on the basis of the mapping result. The mapping processing unit 343 outputs an audio output signal obtained by the serialization processing to the tiling display 10.

For example, in the example of FIG. 18, a sound source region SR1 of the sound source SS1 is estimated as a region extending over the four display units 12. In a case where the speech of the sound source SS1 is small, the mapping processing unit 343 selects the four display units 12 in which the sound source region SR1 is arranged as the mapping destinations of the audio data AD of the sound source SS1.

A sound source region SR2 of the sound source SS2 is estimated as a region extending over the two display units 12. In a case where the speech of the sound source SS2 is large, the mapping processing unit 343 selects two display units 12 (display units 12 with dark hatching) in which the sound source region SR2 is arranged and five display units 12 (display units 12 with light hatching) arranged around the two display units as mapping destinations of the audio data AD of the sound source SS2.

A sound source region SR3 of the sound source SS3 is estimated as a region extending over the two display units 12. In a case where the speech of the sound source SS3 is small, the mapping processing unit 343 selects two display units 12 in which the sound source region SR3 is arranged as the mapping destinations of the audio data AD of the sound source SS3.

[2-5. Control of Sound Image in Depth Direction]

FIGS. 19 to 22 are diagrams for explaining a method of controlling a sound image in a depth direction.

A position of a sound image in the depth direction is controlled by known signal processing such as Monopole Synthesis, wave field synthesis (WFS), Spectral Division Method, and Mode Matching.

Figure 20:
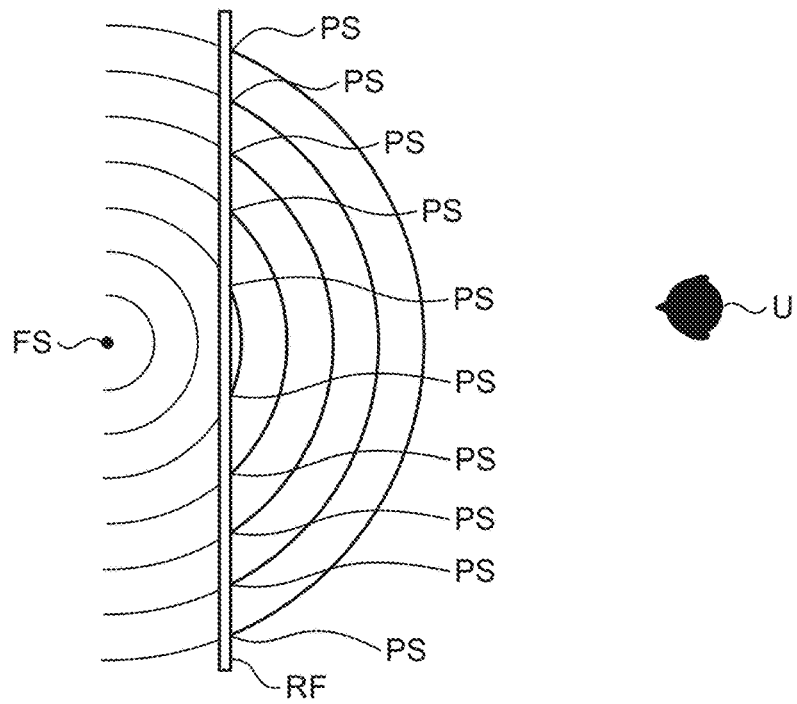
FIG. 20 is a diagram for explaining a method of controlling a sound image in a depth direction.
Figure 21:
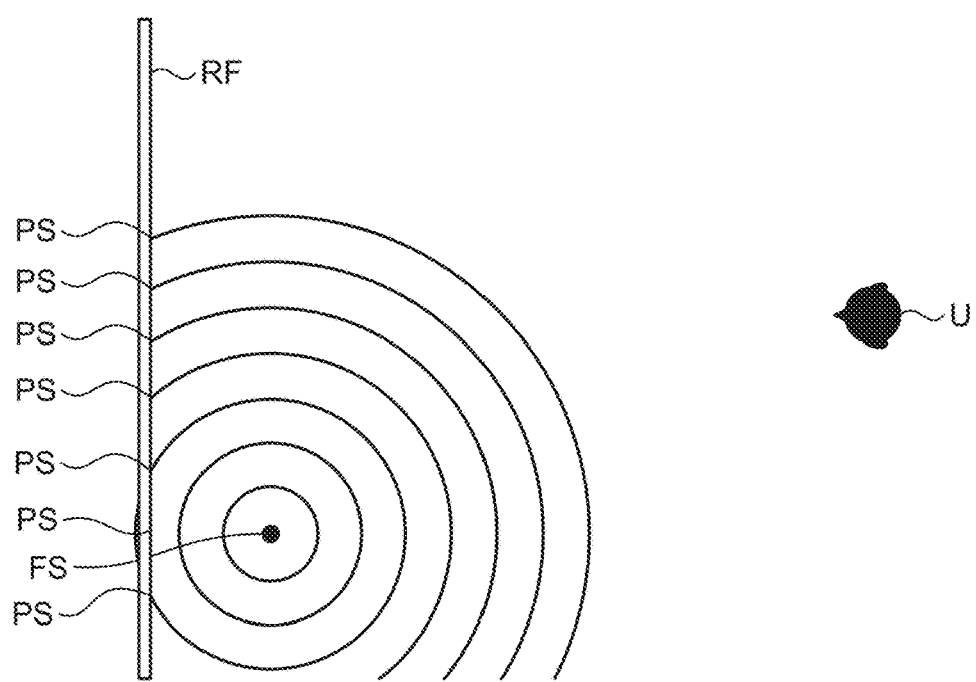
FIG. 21 is a diagram for explaining a method of controlling a sound image in the depth direction.

For example, as illustrated in FIGS. 20 and 21, it is assumed that a plurality of point sound sources PS is arranged on a reference face RF. When sound pressures and phases of the plurality of point sound sources PS are appropriately controlled, a sound field having a focal point FS at a position away from the reference face RF is generated. The sound image is localized at the focal point FS. As illustrated in FIG. 20, when the focal point FS moves deeper than the reference face RF, a sound image that moves away from the viewer U is generated. As illustrated in FIG. 21, when the focal point FS moves to the front of the reference face RF, a sound image approaching the viewer U is generated.

The point sound sources PS correspond to the individual display units 12 or the speakers ASP. The reference face RF corresponds to a screen SCR of the tiling display 10 or an audio output face of an array speaker (first array speaker 21 and second array speaker 22).

Figure 19:
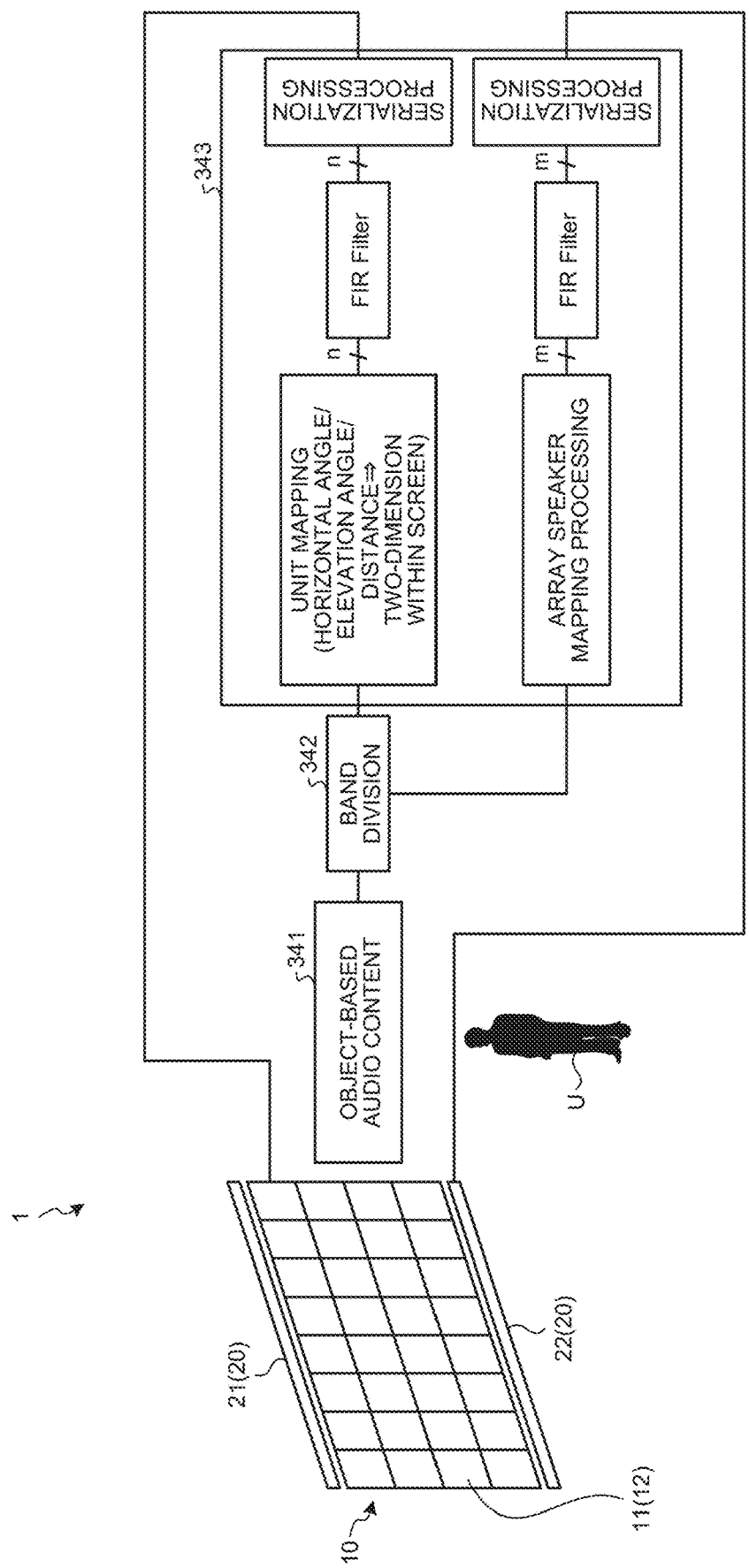
FIG. 19 is a diagram for explaining a method of controlling a sound image in a depth direction.

As illustrated in FIG. 19, the mapping processing unit 343 controls a sound pressure and a phase of the sound output from the display units 12 and the speakers ASP as the mapping destinations using a finite impulse response (FIR) filter.

The mapping processing is similar to the mapping processing illustrated in FIG. 16 except that digital filter processing using the FIR filter is applied to the waveform data PAD. That is, the audio data AD extracted by the sound source extraction unit 341 is divided into the waveform data PAD of the high frequency band HF and the waveform data PAD of the middle low frequency band by the band division unit 342. The waveform data PAD of the high frequency band HF is mapped on n (n is an integer of 2 or more) display units 12 corresponding to the position OB of the object. The waveform data PAD of the middle low frequency band is mapped on m (m is an integer of 2 or more) speakers ASP corresponding to the position OB of the object.

The mapping processing unit 343 performs digital filter processing using the FIR filter on the waveform data PAD of the high frequency band HF. The mapping processing unit 343 adjusts, for each of the display units 12, the sound pressure and the phase of the sound output from the n display units 12 to which the waveform data PAD of the high frequency band HF is to be mapped, by the digital filter processing. The mapping processing unit 343 controls the position of the sound image in the depth direction by adjusting the sound pressure and the phase of the sound output from the display units 12 for each display unit 12.

The mapping processing unit 343 performs the digital filter processing using the FIR filter on the waveform data PAD of the middle low frequency band. The mapping processing unit 343 adjusts the sound pressure and the phase of the sound output from the m speakers ASP to be the mapping destinations of the waveform data PAD of the middle low frequency band for each speaker ASP by the digital filter processing. The mapping processing unit 343 controls the position of the sound image in the depth direction by adjusting the sound pressure and the phase of the sound output from the speakers ASP for each speaker ASP.

[2-6. Localization and Emphasis Control of Sound Image]
[2-6-1. Enhancement of Sound Image Localization Capability by Enlargement of Band]

Figure 22:
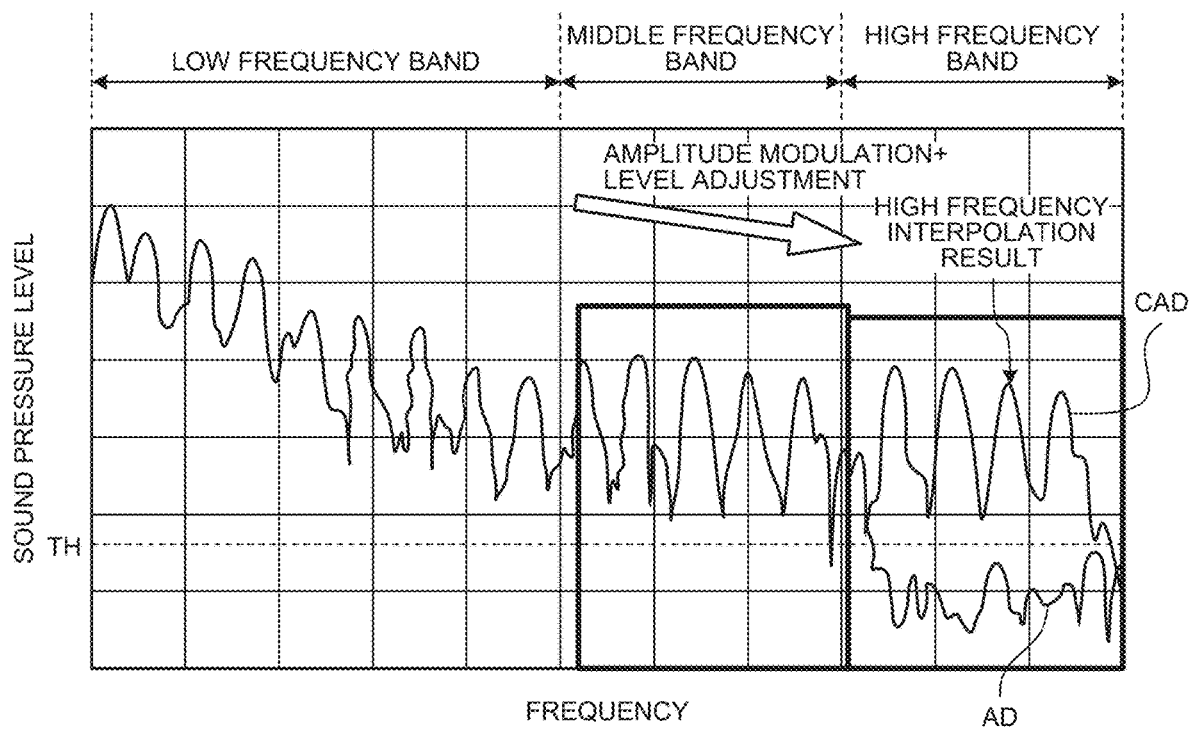
FIG. 22 is a diagram for explaining a method of controlling a sound image in the depth direction.

FIG. 22 is a diagram illustrating an example of a localization and emphasis control technique for a sound image.

FIG. 22 illustrates audio data AD having a low sound pressure level in a high frequency band HF. When the audio data AD is subjected to band division, waveform data PAD of a high frequency band HF having a low sound pressure is generated. Sound image localization ability changes depending on a sound pressure of the waveform data PAD of the high frequency band HF. Therefore, the mapping processing unit 343 generates corrected audio data CAD in which the sound pressure level of the high frequency band HF is higher than or equal to a threshold value TH from the audio data AD in which the sound pressure level of the high frequency band HF is smaller than the threshold value TH by using a high frequency interpolation technology. The mapping processing unit 343 maps the waveform data PAD of the high frequency band HF of the corrected audio data CAD to one or more display units 12 to serve as mapping destinations.

[2-6-2. Enhancement of Sound Image Localization Capability by Preceding Sound Effect]

Figure 23:
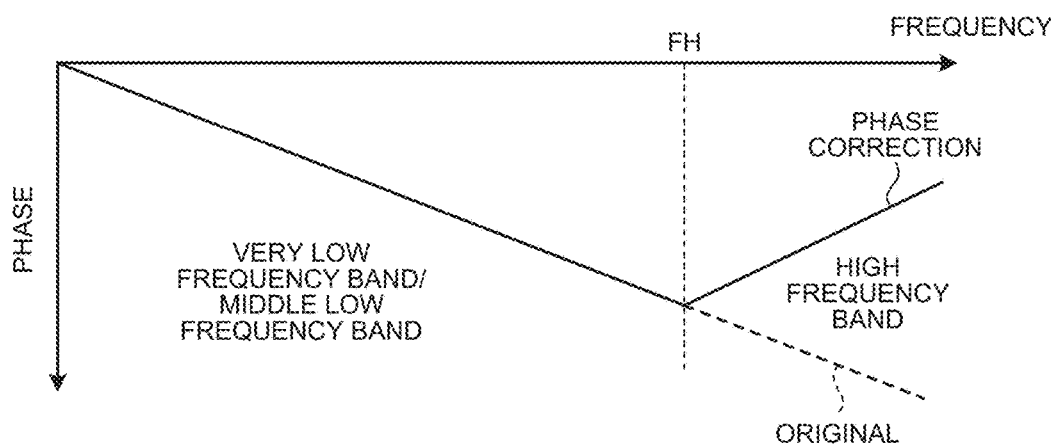
FIG. 23 is a diagram illustrating another example of a localization and emphasis control technique for a sound image.

FIG. 23 is a diagram illustrating another example of the localization and emphasis control technique of the sound image.

FIG. 23 illustrates a relationship between a frequency band and a phase of audio data AD. The phase is related to an output timing of a sound. In the original audio data AD, sounds in the middle low frequency band and the very low frequency band VLF having a low sound image localization ability and a sound in the high frequency band HF having a high sound image localization ability are simultaneously output.

Therefore, the mapping processing unit 343 sets a timing at which the waveform data PAD of the high frequency band HF is output to be the same timing as a timing at which the waveform data PAD of the middle low frequency band and the very low frequency band VLF is output, or to be earlier than a timing at which the waveform data PAD of the middle low frequency band and the very low frequency band VLF is output. By outputting the sound of the high frequency band HF first, the viewer U can quickly recognize a position of the sound image. During a period in which the sounds of the middle low frequency band and the very low frequency band VLF are output, the viewer U can recognize the sound image at a position localized by the sound of the high frequency band HF as a preceding sound.

[2-7. Arrangement of Speaker Units]

Figure 24:
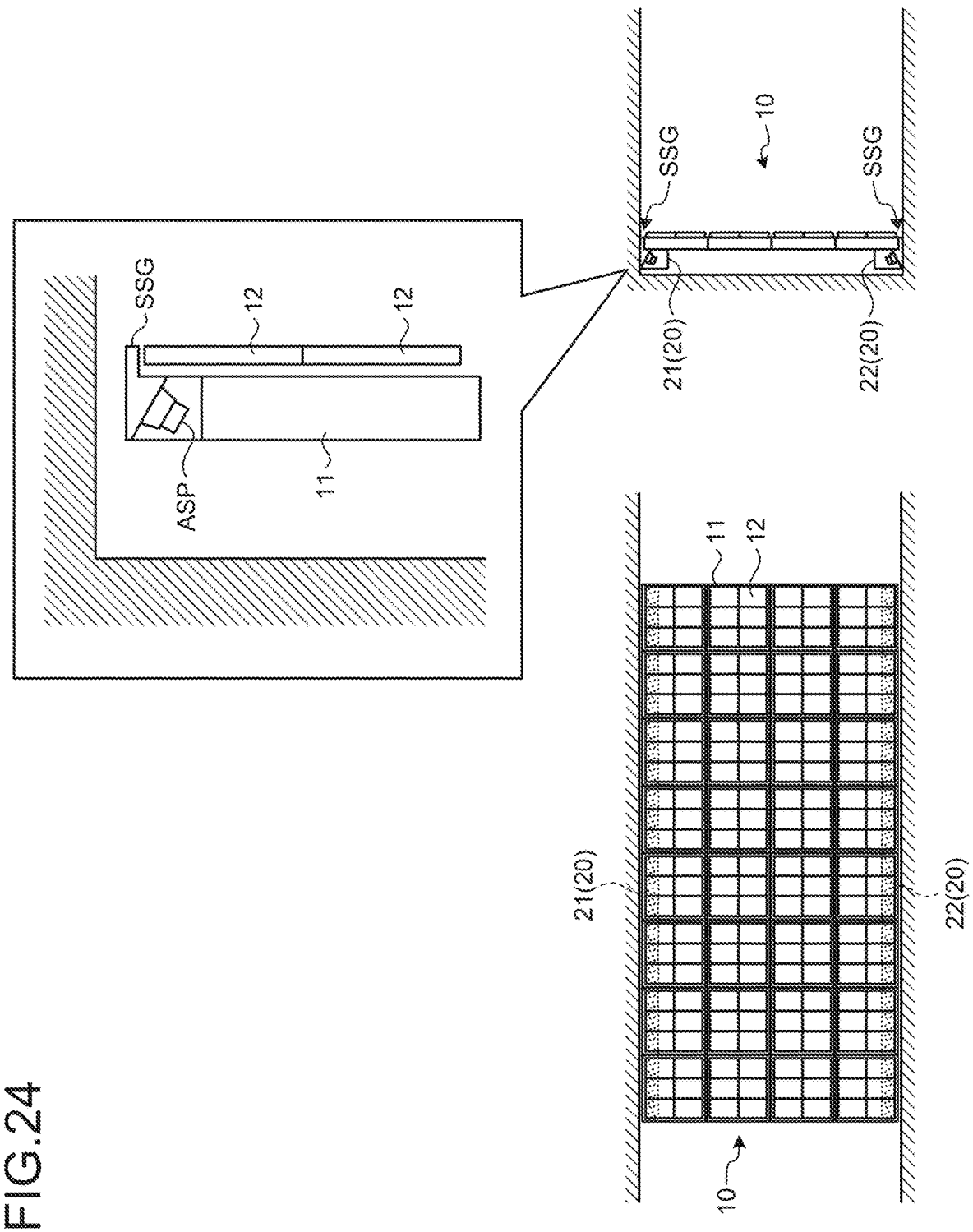
FIG. 24 is a diagram illustrating an example of an arrangement of speaker units.

FIG. 24 is a diagram illustrating an example of an arrangement of speaker units 20.

An enclosure for accommodating the first array speaker 21 is attached to the uppermost cabinets 11 of the tiling display 10. An enclosure for accommodating the second array speaker 22 is attached to the lowermost cabinets 11 of the tiling display 10. The enclosure is provided with a slit serving as a sound guiding part SSG. A width of the slit is narrower than a diameter of the speaker ASP. A sound output from the speaker ASP is emitted to the outside of the enclosure via the sound guiding part SSG. The sound guiding part SSG is disposed close to an edge of the tiling display 10. Since the sound is output from the edge of the tiling display 10, high sound image localization ability can be obtained.

Note that, as illustrated in an enlarged view, the speaker ASP may be housed in the cabinet 11. In this case, an end dedicated cabinet with a built-in speaker having the sound guiding part SSG is disposed at an uppermost stage and a lowermost stage of the tiling display 10.

[2-8. Method of Detecting Positions of Display Units]

Figure 25:
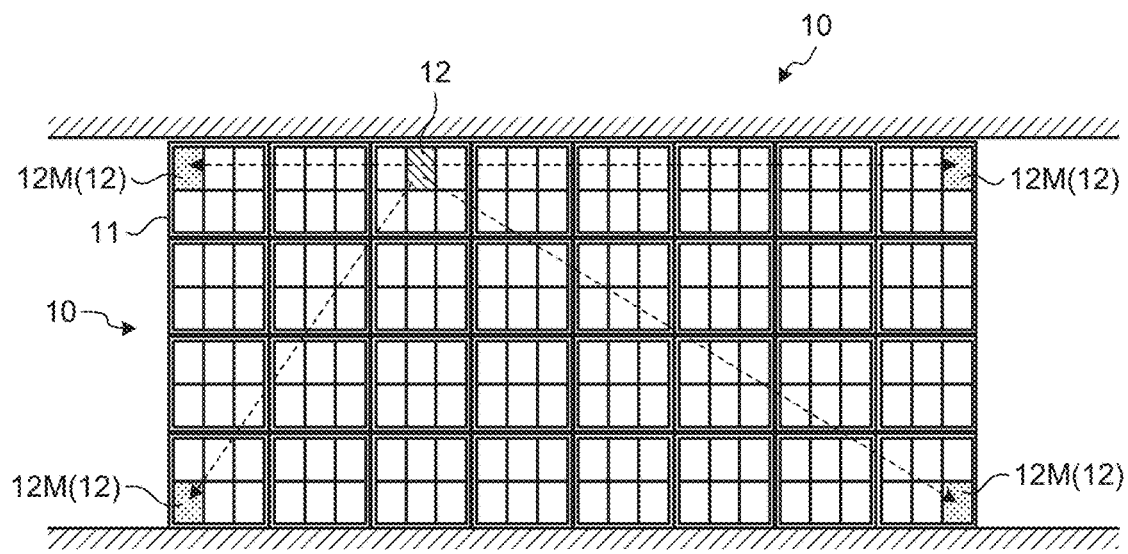
FIG. 25 is a diagram illustrating an example of a method of detecting positions of display units.
Figure 26:
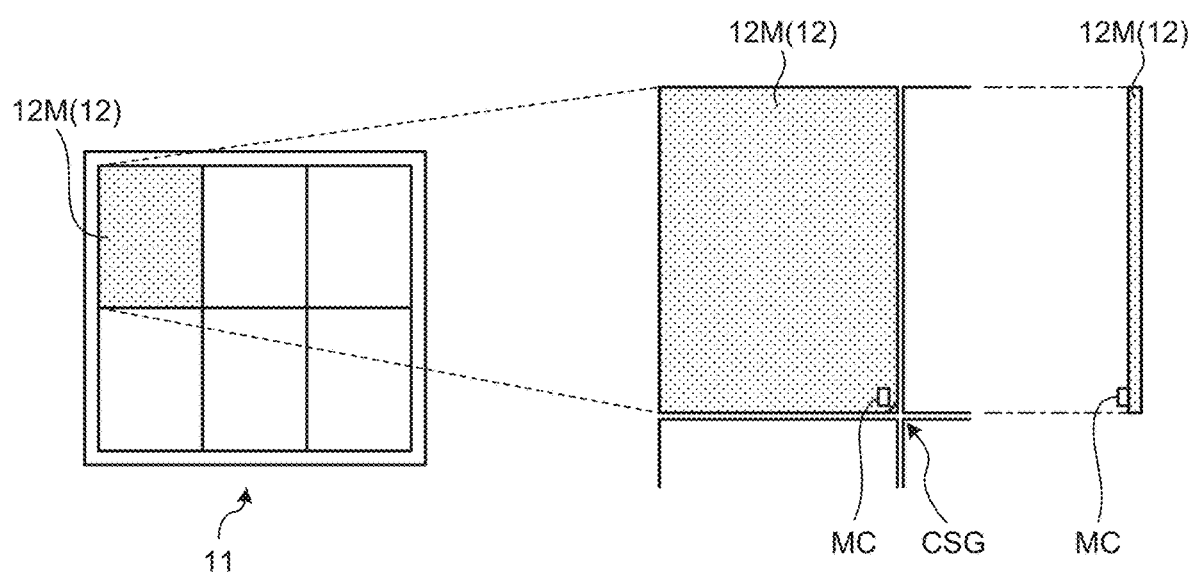
FIG. 26 is a diagram illustrating an arrangement of microphones used to detect positions of the display units.

FIG. 25 is a diagram illustrating an example of a method of detecting the positions of the display units 12. FIG. 26 is a diagram illustrating an arrangement of microphones MC used for detecting the positions of the display units 12.

As illustrated in FIG. 25, display units 12M with microphones are arranged at four corner parts of the tiling display 10. As illustrated in FIG. 26, the microphone MC is attached to a back surface of the display unit 12M with microphone. A notch to be a sound guiding part CSG is formed at one corner part of the display unit 12M with microphone. The microphone MC is disposed near a corner part of the display unit 12M with microphone in which the notch is formed.

The position detection unit 344 detects the spatial position of the display unit 12 on the basis of the time during which a sound (impulse) output from the display units 12 is transmitted to the microphones MC provided at a plurality of places. The position detection unit 344 assigns the logical number LN to each display unit 12 based on the spatial arrangement of each display unit 12.

For example, the position detection unit 344 selects one display unit 12 for each cabinet 11, and causes the selected display unit 12 to output a sound (impulse). The position detection unit 344 acquires measurement data MD regarding the sound transmission time from each microphone MC. The position detection unit 344 detects the spatial position of the cabinet 11 based on the measurement data MD acquired from each microphone MC.

An arrangement of the display units 12 in the cabinet 11 is specified in the reproduction environment information 352. The position detection unit 344 detects a relative position between the cabinet 11 and each display unit 12 held in the cabinet 11 based on information about the arrangement defined in the reproduction environment information 352. The position detection unit 344 detects a position of each display unit 12 based on the position of the cabinet 11 and the relative position of each display unit 12 with respect to the cabinet 11.

If there is an obstacle reflecting a sound on the front surface of the tiling display 10, accurate measurement may not be possible. In this case, the measurement accuracy is enhanced by installing the microphones MC in all the display units 12 or the plurality of display units 12 arranged at a constant density. Note that the microphones MC can also be used for acoustic correction of a sound output from the display units 12.

Figure 27:
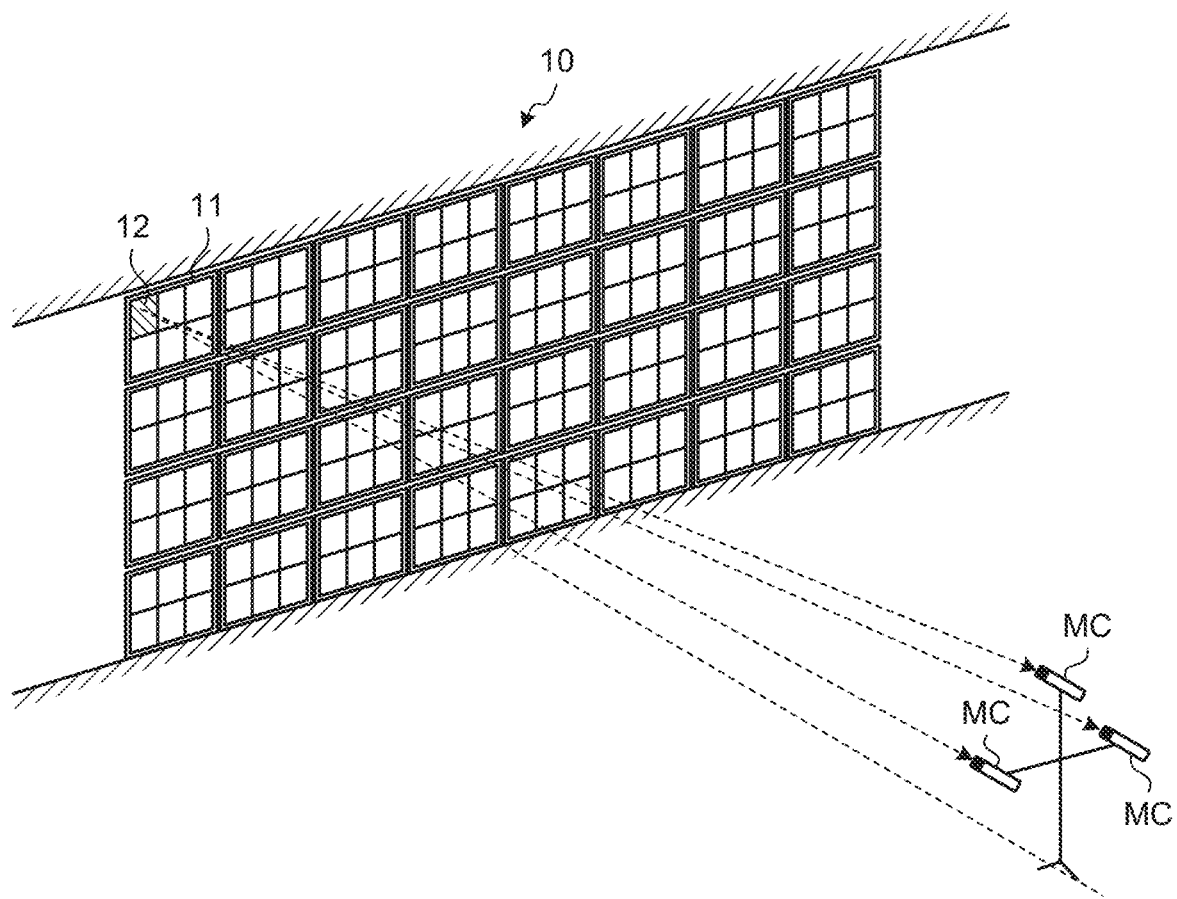
FIG. 27 is a diagram illustrating another example of a method of detecting physical positions of the display units.

FIG. 27 is a view illustrating another example of the method for detecting the positions of the display units 12.

In the example of FIG. 27, the plurality of microphones MC is arranged outside the tiling display 10. Although the positions of the microphone MC are different, the position detection unit 344 can detect the position of each display unit 12 by a method similar to that described in FIG. 25. In the example of FIG. 27, it is not necessary to provide the sound guiding part CSG for transmitting sound to the microphones MC on the tiling display 10. Therefore, deterioration in image quality due to the sound guiding part CSG hardly occurs.

[2-9. Directivity Control of Reproduction Sound]

Figure 28:
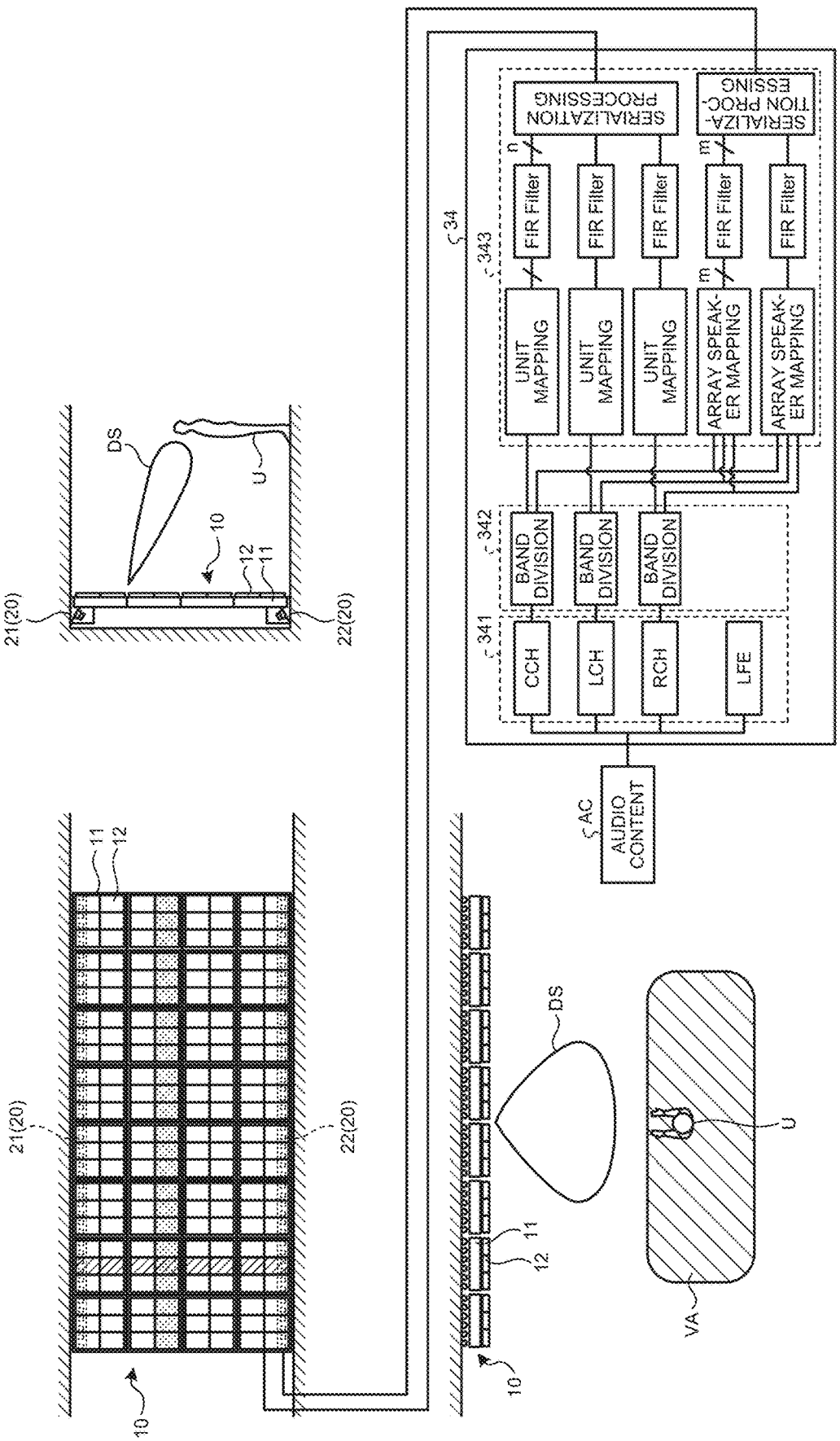
FIG. 28 is a diagram for explaining directivity control of a reproduction sound.

FIG. 28 is a diagram for explaining directivity control of a reproduction sound DS.

The directivity of the reproduction sound DS is controlled using interference of wave fronts of the plurality of arranged point sound sources. For example, the directivity of the reproduction sound DS in the height direction is controlled by interference of wave fronts of the plurality of point sound sources arranged in the height direction. The directivity of the reproduction sound DS in the width direction is controlled by interference of wave fronts of the plurality of point sound sources arranged in the width direction. The point sound sources correspond to the individual display units 12 or the speakers ASP. For example, the mapping processing unit 343 individually controls the sound pressure and the phase of the sound output from each display unit 12 and the speaker ASP as the mapping destinations using the FIR filter.

The mapping processing is similar to the mapping processing illustrated in FIG. 15 except that the digital filter processing using the FIR filter is applied to the waveform data PAD. That is, the audio data AD extracted by the sound source extraction unit 341 is divided into the waveform data PAD of the high frequency band HF and the waveform data PAD of the middle low frequency band by the band division unit 342. The waveform data PAD of the high frequency band HF is mapped on n (n is an integer of 2 or more) display units 12 corresponding to the positions of the multichannel speakers. The waveform data PAD of the middle low frequency band is mapped to m (m is an integer of 2 or more) speakers ASP corresponding to the positions of the multichannel speakers.

The mapping processing unit 343 performs digital filter processing using the FIR filter on the waveform data PAD of the high frequency band HF. The mapping processing unit 343 adjusts, for each of the display units 12, the sound pressure and the phase of the sound output from the n display units 12 to which the waveform data PAD of the high frequency band HF is to be mapped, by the digital filter processing. The mapping processing unit 343 controls acoustic characteristics such as directivity of the reproduction sound DS and uniformity of the sound pressure in a viewing area VA by adjusting the sound pressure and the phase of the sound output from the display units 12 for each display unit 12.

The mapping processing unit 343 performs the digital filter processing using the FIR filter on the waveform data PAD of the middle low frequency band. The mapping processing unit 343 adjusts the sound pressure and the phase of the sound output from the m speakers ASP to be the mapping destinations of the waveform data PAD of the middle low frequency band for each speaker ASP by the digital filter processing. The mapping processing unit 343 controls acoustic characteristics such as directivity of the reproduction sound DS and uniformity of the sound pressure in the viewing area VA by adjusting the sound pressure and the phase of the sound output from the speakers ASP for each speaker ASP.

FIG. 29 is a diagram illustrating an example in which different reproduction sounds DS are distributed for each viewer U.

One or more cameras CA are installed near the tiling display 10. Each of the camera CA is a wide-angle camera capable of capturing an image in front of the tiling display 10. In the example of FIG. 29, in order to cover the entire viewing area VA of the tiling display 10, one camera CA is installed on each side in the width direction of the tiling display 10.

The control system 30 detects the number of viewers U and the position of each viewer U existing in the viewing area VA on the basis of image-capturing data acquired from each camera CA. On the tiling display 10, videos of a plurality of sound sources SS set for each viewer U are displayed at different positions on the screen SCR. For each sound source SS, the mapping processing unit 343 selects the plurality of display units 12 corresponding to the display position of the sound source SS as mapping destinations of the audio data AD of the sound source SS. The mapping processing unit 343 generates and outputs the reproduction sound DS having high directivity from the sound source SS toward the viewer U for each viewer U on the basis of the position information of each viewer U.

[2-10. Information Processing Method]

Figure 30:
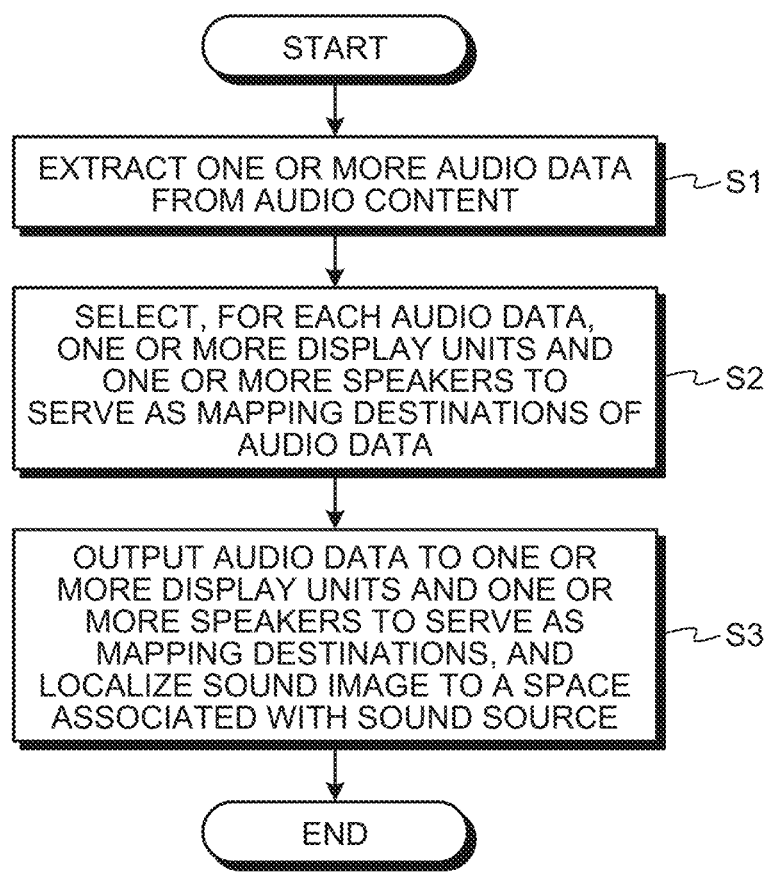
FIG. 30 is a flowchart illustrating an example of an information processing method performed by the control system.

FIG. 30 is a flowchart illustrating an example of an information processing method performed by the control system 30.

In step S1, the sound source extraction unit 341 extracts one or more audio data AD from the audio content AC. As the audio content AC, audio content of various types such as channel-based audio, object-based audio, and scene-based audio can be used. For example, the sound source extraction unit 341 extracts one or more audio data AD generated for each channel or each object serving as a sound source from the audio content AC.

In step S2, the mapping processing unit 343 selects, for each audio data AD, one or more display units 12 and one or more speakers ASP to serve as mapping destinations of the audio data AD. For example, the mapping processing unit 343 detects the sound source region SR on the screen SCR corresponding to the position of the multichannel speaker or the position OB of the object. The mapping processing unit 343 selects one or more display units 12 and one or more speakers ASP corresponding to the sound source region SR as the mapping destinations. The mapping processing unit 343 spreads the mapping destinations to the outside of the sound source region SR on the basis of the sound pressure of the audio data AD, the position of the sound image in the depth direction, the directivity of the reproduction sound DS, and the like.

In step S3, the mapping processing unit 343 outputs the audio data AD to the one or more display units 12 and the one or more speakers ASP to serve as the mapping destinations, and localizes the sound image to a position (sound source region SR or position shifted from the sound source region SR in the depth direction) associated with the sound source.

[2-11. Effects]

The control system 30 includes the sound source extraction unit 341 and the mapping processing unit 343. The sound source extraction unit 341 extracts one or more audio data AD corresponding to different sound sources from the audio content AC. The mapping processing unit 343 selects one or more display units 12 to be mapping destinations of the audio data AD for each audio data AD from one or more combinable display units 12 including a sound producing mechanism. In the information processing method of the present embodiment, the processing of the control system 30 described above is executed by a computer. The program of the present embodiment causes a computer to realize the processing of the control system 30 described above.

According to this configuration, the audio data AD is directly reproduced by the display units 12. Therefore, it is easy to obtain a sense of unity between the video and the audio.

The audio data AD is audio data for a multichannel speaker extracted from the audio content AC of the channel-based audio. The mapping processing unit 343 selects one or more display units 12 determined by the arrangement of the multichannel speakers as mapping destinations.

According to this configuration, a powerful sound as if the multichannel speakers are arranged in front of the screen SCR can be obtained.

The audio data AD is audio data of an object extracted from the audio content AC of the object-based audio. The mapping processing unit 343 selects one or more display units 12 corresponding to the position OB of the object extracted from the audio content AC as mapping destinations.

According to this configuration, a sound image of the object can be localized at the position OB of the object.

The control system 30 includes the sound source position estimation unit 345. The sound source position estimation unit 345 estimates a position where the sound source SS of the audio data AD is displayed for each audio data AD. The mapping processing unit 343 selects one or more display units 12 corresponding to the position where the sound source SS is displayed as mapping destinations.

According to this configuration, a sound image of the sound source SS can be localized at the position where the sound source SS is displayed.

The mapping processing unit controls the position of the sound image in the depth direction by adjusting the sound pressure and the phase of a sound output from the plurality of display units 12 to serve as mapping destinations for each display unit 12.

According to this configuration, the position of the sound image in the depth direction is easily controlled.

The control system 30 includes the band division unit 342. The band division unit 342 divides the audio data AD for each frequency band. The mapping processing unit 343 maps the waveform data PAD of the high frequency band HF having the highest frequency among the audio data AD to one or more display units 12 to serve as mapping destinations.

According to this configuration, a sound in the high frequency band HF having high sound image localization ability is output from the display units 12. Therefore, a shift hardly occurs between the position of the sound source and the position of the sound image.

The mapping processing unit 343 selects one or more speakers ASP corresponding to the position of the sound source of the audio data AD from the plurality of speakers ASP arranged around the plurality of display units 12. The mapping processing unit 343 maps the waveform data PAD of the low frequency band LF having the lowest frequency among the audio data AD and the waveform data PAD of the middle frequency band MF between the high frequency band HF and the low frequency band LF to the selected one or more speakers ASP.

According to this configuration, sounds of the middle frequency band MF and the low frequency band LF having lower sound image localization ability than the high frequency band HF are output from the speakers ASP. Since a sound output from the display units 12 is only a sound of the high frequency band HF, the vibration of the display units 12 when the sound is output is minimized.

The mapping processing unit 343 generates the corrected audio data CAD in which the sound pressure level of the high frequency band HF is higher than or equal to a threshold value from the audio data AD in which the sound pressure level of the high frequency band HF is smaller than the threshold value. The mapping processing unit 343 maps the waveform data PAD of the high frequency band HF of the corrected audio data CAD to one or more display units 12 to serve as mapping destinations.

According to this configuration, a high sound image localization ability can be obtained even for the audio data AD having a low sound pressure level in the high frequency band HF.

The mapping processing unit 343 sets a timing at which the waveform data PAD of the high frequency band HF is output to be the same timing as a timing at which the waveform data PAD of the middle frequency band MF and the low frequency band LF is output, or to be earlier than a timing at which the waveform data PAD of the middle frequency band MF and the low frequency band LF is output.

According to this configuration, the output timing of the waveform data PAD of the high frequency band HF having a high sound image localization ability is advanced. Therefore, the sound image localization ability of the audio data AD is enhanced by the preceding sound effect.

The control system 30 includes the position detection unit 344. The position detection unit 344 detects a spatial arrangement of the plurality of display units 12. The position detection unit 344 assigns a logical number LN to each of the display units 12 based on the detected spatial arrangement. The mapping processing unit 343 specifies the mapping destination on the basis of the logical number LN.

According to this configuration, addressing of the display units 12 can be automatically performed.

The position detection unit 344 detects the spatial arrangement of the display units 12 on the basis of the time during which the sound output from the display units 12 is transmitted to each of the microphones MC provided at a plurality of places.

According to this configuration, the spatial arrangement of the display units 12 can be easily detected.

The mapping processing unit controls the directivity of the reproduction sound DS by adjusting the sound pressure and the phase of the sound output from the plurality of display units 12 as mapping destinations for each display unit 12.

According to this configuration, the directivity of the reproduction sound DS is controlled by the interference of the wave fronts output from the display units 12.

3. Second Embodiment

[3-1. Image of System]

Figure 31:
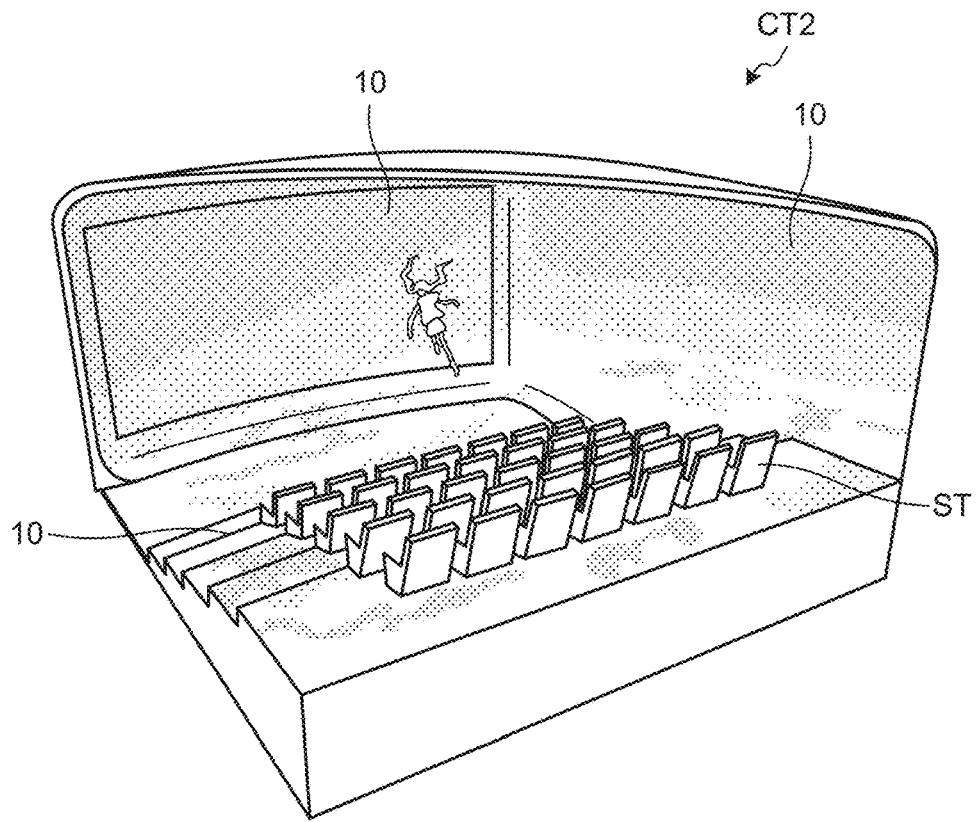
FIG. 31 is a diagram illustrating an example in which the audio/video content output system is applied to a theater.
Figure 32:
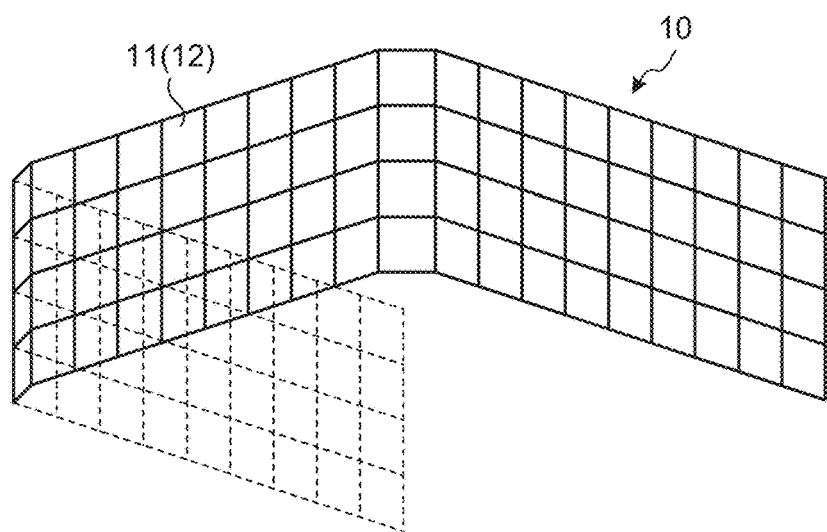
FIG. 32 is a diagram illustrating an example in which the audio/video content output system is applied to a theater.

FIGS. 31 and 32 are diagrams illustrating an example in which an audio/video content output system 1 is applied to a theater CT2.

As illustrated in FIG. 31, the theater CT2 is a theater capable of displaying an entire-celestial-sphere picture. As illustrated in FIG. 32, a tiling display 10 is disposed so as to entirely cover a front surface, right and left surfaces, a ceiling surface, and a floor surface of a guest seat ST. A sound is reproduced from all directions by a large number of display units 12 installed in all directions.

[3-2. Arrangement of Speaker Units]

Figure 33:
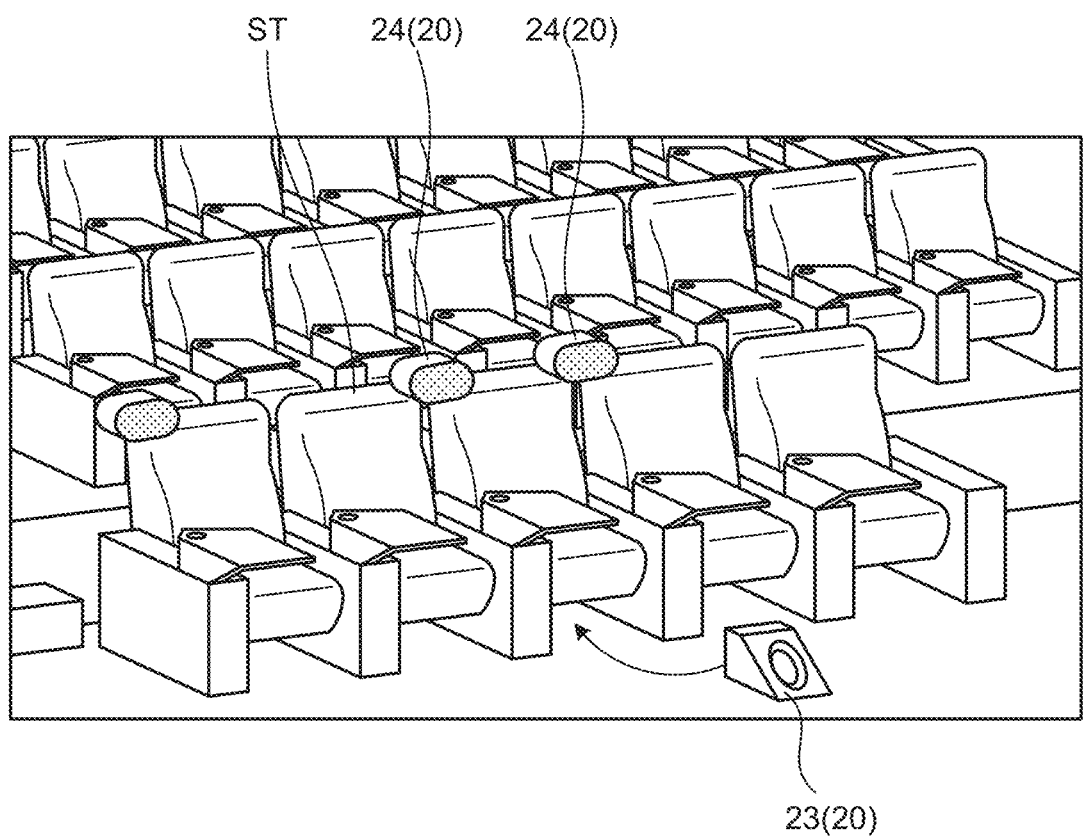
FIG. 33 is a diagram illustrating an example of an arrangement of speaker units.

FIG. 33 is a diagram illustrating an example of an arrangement of speaker units 20.

In the theater CT2, a large number of the display units 12 are arranged in all directions without gaps. Therefore, an installation space of the speaker units 20 is limited. For example, in the first embodiment, the speaker units 20 (first array speaker 21 and second array speaker 22) for the middle low frequency band are installed along the upper side and the lower side of the tiling display 10. However, in the theater CT2, since the tiling display 10 is installed in all directions, there is no space for installing the first array speaker 21 and the second array speaker 22.

Therefore, in the theater CT2, a woofer 24 is installed on a shoulder part of a seat of the guest seat ST as the speaker unit 20 for the middle low frequency band. A subwoofer 23, which is the speaker unit 20 for the very low frequency band VLF, is installed under the seat. A sound of the high frequency band HF having high sound image localization ability is output from the display units 12. By installing the speaker unit 20 on the sheet, a distance from the speaker unit 20 to the viewer U is shortened. Therefore, it is not necessary to reproduce unnecessary sound pressure. Therefore, unnecessary reverberation in the theater CT2 is suppressed.

Figure 34:
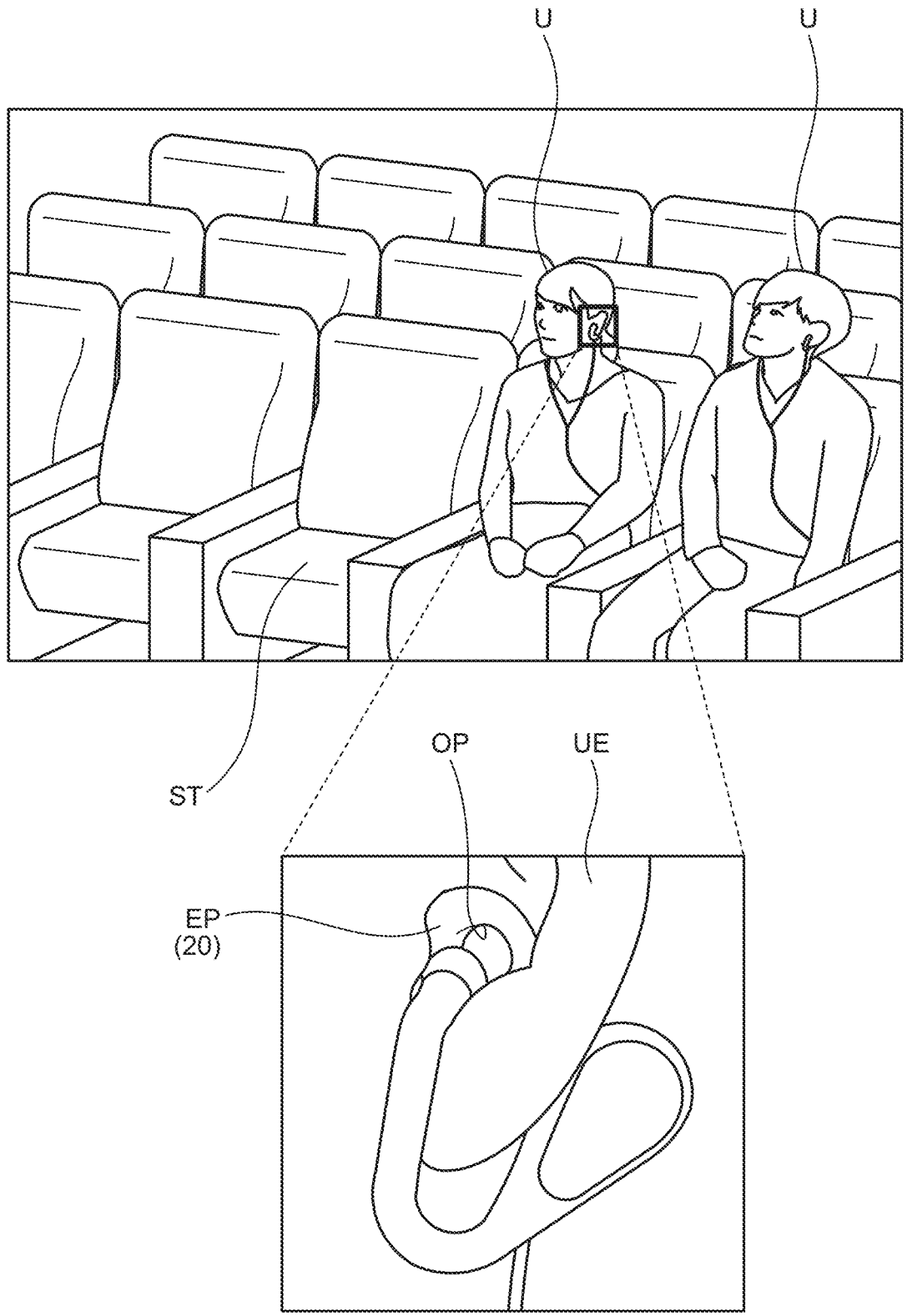
FIG. 34 is a diagram illustrating another example of the arrangement of the speaker units.

FIG. 34 is a diagram illustrating another example of the arrangement of the speaker units 20.

In the example of FIG. 34, an open type earphone EP is worn on an ear UE of the viewer U as the speaker unit 20 for middle low frequency band. The earphone EP has an opening part OP in an ear hole part. The viewer U can view a sound output from the display units 12 via the opening part OP. The speaker unit 20 is not necessarily the earphone EP, and may be a wearable sound device (open headphones, shoulder speakers, and the like) that can be worn by the viewer U. Also in the example of FIG. 34, a distance from the speaker unit 20 to the viewer U is shortened. Therefore, it is not necessary to reproduce unnecessary sound pressure, and unnecessary reverberation is suppressed.

[3-3. Measurement of Spatial Characteristics and Reverberation Cancellation by Built-In Microphones]

Figure 35:
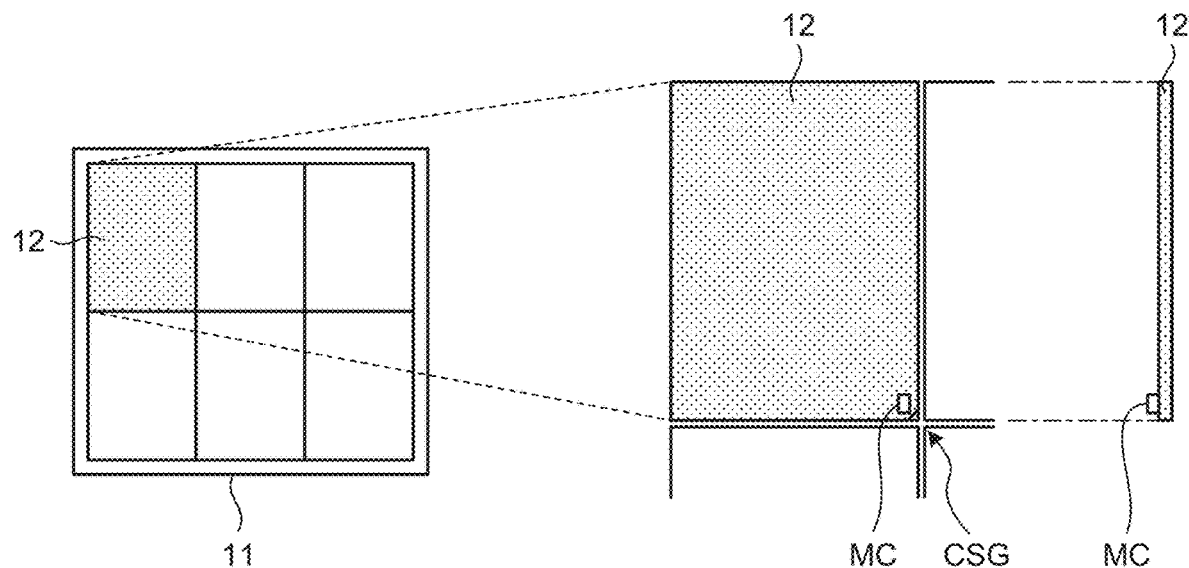
FIG. 35 is a diagram illustrating an arrangement of microphones used for measuring spatial characteristics.

FIG. 35 is a diagram illustrating an arrangement of microphones MC used for measuring spatial characteristics.

Since the tiling display 10 covers all directions, sound reflection occurs between screen parts facing each other, and a sense of localization may be reduced. Therefore, the control system 30 controls the sound pressure and the phase of each display unit 12 based on the spatial characteristics of the theater CT2 measured in advance, and reduces reverberation. The arrangement of the microphones MC is similar to that described in FIG. 26. In the example of FIG. 26, the microphones MC are installed only in the specific display units 12, but in the present embodiment, the microphones MC are installed in all the display units 12.

The spatial characteristics of the theater CT2 are measured using the microphone MC built in each display unit 12. For example, in the theater CT2, the output characteristics of the output sound of the display unit 12 with respect to all the other display units (microphones MC) are measured for each display unit 12. By this measurement, a transmission characteristic (transmission characteristic in which frequency and sound pressure are variables, and transmission characteristic in which frequency and phase (including transmission time) are variables) of the wave front is measured. The spatial characteristics of the theater CT2 are detected on the basis of the transmission characteristics. The spatial characteristics of the theater CT2 are stored in the storage unit 35 as the reproduction environment information 352.

Based on the spatial characteristics of the theater CT2, the mapping processing unit 343 adjusts the sound pressure and the phase of the sound output from the plurality of display units 12 to be mapped for each display unit 12, and reduces reverberation. For example, the display units 12 selected as the mapping destinations are set as mapping destination units, and the display units 12 not selected as the mapping destinations are set as non-mapping destination units. When sounds output from the mapping destination units reach the non-mapping destination units and are reflected, the mapping processing unit 343 causes the non-mapping destination units to reproduce sounds having an opposite phase to a primary reflection wave front. As a result, reverberation due to reflection in the non-mapping destination units is reduced.

4. Third Embodiment

[4-1. Image of System]

FIG. 36 is a diagram illustrating an example in which an audio/video content output system 1 is applied to a telepresence system TP.

The telepresence system TP is a system that performs a conference by bidirectional video and audio by connecting remote locations. The entire wall is a tiling display 10 that displays an image of a remote location. The video and audio of a viewer U1 at the first remote location are output from a tiling display 10B at the second remote location to a viewer U2. The video and audio of the viewer U2 at the second remote location are output from a tiling display 10A at the first remote location to the viewer U1.

[4-2. Sound Collection and Reproduction of Object Sound]

Figure 37:
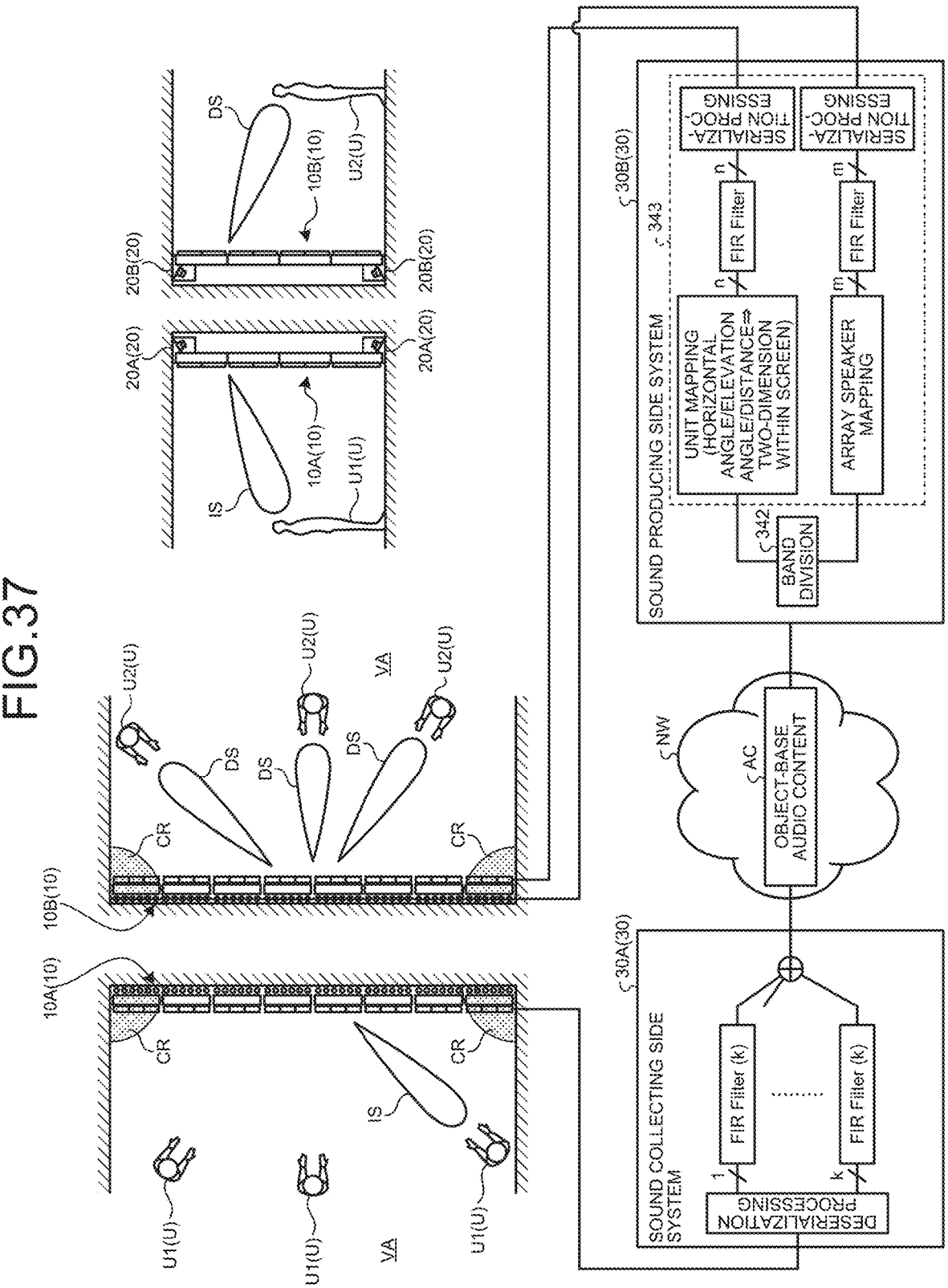
FIG. 37 is a diagram illustrating an example of sound collection processing and reproduction processing of an object sound.

FIG. 37 is a diagram illustrating an example of sound collection processing and reproduction processing of an object sound.

One or more cameras CA are installed near the tiling display 10. Each of the camera CA is a wide-angle camera capable of capturing an image in front of the tiling display 10. In the example of FIG. 37, in order to cover the entire viewing area VA of the tiling display 10, one camera CA is installed on each side in the width direction of the tiling display 10.

In the first remote place, the number of viewers U1 existing in the viewing area VA, the position of each viewer U1, the movement of the mouth of each viewer U1, and the like are detected on the basis of image-capturing data of each camera CA. The voice of the viewer U1 is collected as an input sound IS by the high-directional microphone built in each display unit 12. A control system 30A inputs sound collection data and imaging data of the camera CA to DNN to perform sound source separation, and generates the audio content AC using the voice of the viewer U1 serving as a sound source as an object. The control system 30A generates the content data CD using the video content using the imaging data of the camera CA and the audio content AC generated using the input sound IS.

A control system 30B at the second remote location acquires the content data CD generated by the control system 30A at the first remote location via a network NW. The control system 30B separates the audio content AC and the video content VC from the content data CD. The control system 30B reproduces the video of the viewer U1 at the first remote location on the tiling display 10B using the video content VC. The control system 30B reproduces the audio of the viewer U1 at the first remote location by the tiling display 10B and the plurality of speaker units 20B using the audio content AC. Reproduction processing of the audio content AC is similar to that illustrated in FIG. 16.

When reproducing the audio content AC, the control system 30B detects the number of viewers U2 and the position of each viewer U2 existing in the viewing area VA based on the image-capturing data acquired from each camera CA. On the tiling display 10B, the video of the viewer U1 at the first remote location, which is the sound source of the object, is displayed on the screen SCR. The mapping processing unit 343 selects a plurality of display units 12 corresponding to the position of the object (the voice of the viewer U1) as mapping destinations of the audio data AD of the object. Based on the position information of each viewer U2, the mapping processing unit 343 generates and outputs, for each viewer U2, the reproduction sound DS having high directivity from the plurality of display units 12 as mapping destinations toward the viewer U2. A method of controlling the orientation of the reproduction sound DS is similar to that illustrated in FIG. 29.

5. Fourth Embodiment

FIG. 38 is a diagram illustrating an example in which an audio/video content output system 1 is applied to a digital signage system DSS.

The digital signage system DSS is a system that transmits information using a digital video device instead of a conventional signboard or paper poster. A building, a wall of a passage, or the like is a tiling display 10 that displays an image. In the digital signage system DSS, a digital advertisement DC is generated for each viewer U. On the tiling display 10, a plurality of the digital advertisements DC generated for each viewer U are displayed at different positions on a screen SCR. The mapping processing unit 343 selects a plurality of display units 12 corresponding to the display position of the digital advertisement DC as mapping destinations of the audio data AD of the digital advertisement DC for each digital advertisement DC serving as a sound source. The mapping processing unit 343 generates and outputs a reproduction sound having high directivity from the display position of the digital advertisement DC toward the viewer U for each viewer U based on the position information of each viewer U.

Note that the effects described in the present specification are merely examples and are not limited, and other effects may be provided.

Supplementary Note

Note that the present technique can also have the following configurations.

(1)

An information processing apparatus comprising:
  a sound source extraction unit that extracts one or more audio data corresponding to different sound sources from audio content; and
  a mapping processing unit that selects, for each audio data, one or more display units to serve as mapping destinations of the audio data from one or more combinable display units including a sound producing mechanism.

(2)

The information processing apparatus according to (1), wherein
  the audio data includes audio data for a multichannel speaker extracted from the audio content of channel-based audio, and
  the mapping processing unit selects one or more display units determined by an arrangement of the multichannel speaker as the mapping destinations.

(3)

The information processing apparatus according to (1), wherein
  the audio data includes audio data of an object extracted from the audio content of object-based audio, and
  the mapping processing unit selects one or more display units corresponding to a position of the object extracted from the audio content as the mapping destinations.

(4)

The information processing apparatus according to (1), further comprising
  a sound source position estimation unit that estimates a position where a sound source of the audio data is displayed for each audio data,
  wherein the mapping processing unit selects one or more display units corresponding to a position where the sound source is displayed as the mapping destinations.

(5)

The information processing apparatus according to (3) or (4), wherein
  the mapping processing unit adjusts a sound pressure and a phase of a sound output from a plurality of the display units as the mapping destinations for each display unit to control a position of a sound image in a depth direction.

(6)

The information processing apparatus according to any one of (1) to (5), further comprising
  a band division unit that divides the audio data for each frequency band,
  wherein the mapping processing unit maps waveform data of a high frequency band having a highest frequency among the audio data to the one or more display units to serve as the mapping destinations.

(7)
The information processing apparatus according to (6), wherein
the mapping processing unit selects one or more speakers corresponding to a position of a sound source of the audio data from a plurality of speakers arranged around a plurality of the display units, and maps waveform data of a low frequency band having a lowest frequency among the audio data and waveform data of a middle frequency band between the high frequency band and the low frequency band to the selected one or more speakers.

(8)
The information processing apparatus according to (6) or (7), wherein
the mapping processing unit generates corrected audio data in which a sound pressure level in the high frequency band is higher than or equal to a threshold value from audio data in which a sound pressure level in the high frequency band is smaller than the threshold value, and maps waveform data of the high frequency band of the corrected audio data to the one or more display units to serve as the mapping destinations.

(9)
The information processing apparatus according to (7), the mapping processing unit sets a timing at which the waveform data of the high frequency band is output to be an identical timing with a timing at which the waveform data of the middle frequency band and the low frequency band is output or to be earlier than a timing at which the waveform data of the middle frequency band and the low frequency band is output.

(10)
The information processing apparatus according to any one of (1) to (9), further comprising
a position detection unit that detects a spatial arrangement of a plurality of the display units and assigns a logical number to each of the display units based on the spatial arrangement,
wherein the mapping processing unit specifies the mapping destinations based on the logical number.

(11)
The information processing apparatus according to (10), wherein
the position detection unit detects the spatial arrangement of the display units based on a time during which a sound output from the display units is transmitted to each of microphones provided at a plurality of locations.

(12)
The information processing apparatus according to any one of (1) to (11), wherein
the mapping processing unit adjusts a sound pressure and a phase of a sound output from a plurality of the display units as the mapping destinations for each display unit to control directivity of a reproduction sound.

(13)
The information processing apparatus according to any one of (1) to (12), wherein
the mapping processing unit adjusts a sound pressure and a phase of a sound output from a plurality of the display units as the mapping destinations for each display unit to reduce reverberation.

(14)
An information processing method executed by a computer, the method comprising:
extracting one or more audio data corresponding to different sound sources from audio content; and
selecting, for each audio data, one or more display units to serve as mapping destinations of the audio data from one or more combinable display units including a sound producing mechanism.

(15)
A program that causes a computer to implement:
extract one or more audio data corresponding to different sound sources from the audio content; and
select, for each audio data, one or more display units to serve as mapping destinations of the audio data from one or more combinable display units including a sound producing mechanism.

REFERENCE SIGNS LIST

12 Display Unit
30 Control System (Information Processing Apparatus)
341 Sound Source Extraction Unit
342 Band Division Unit
343 Mapping Processing Unit
344 Position Detection Unit
345 Sound Source Position Estimation Unit
AC Audio Content
AD Audio Data

The invention claimed is:

1. An information processing apparatus comprising:
a sound source extractor that extracts one or more audio data corresponding to different sound sources from audio content; and
a mapping processor that selects, for each audio data, one or more display tiles to serve as mapping destinations of the audio data from one or more combinable display tiles including a sound producing mechanism, wherein
the audio data includes audio data of an object extracted from the audio content of object-based audio,
the mapping processor selects one or more display tiles corresponding to a position of the object on a display screen extracted from the audio content as the mapping destinations, and
the mapping processor adjusts a sound pressure and a phase of a sound output from a plurality of the display tiles as the mapping destinations for each display tile to control a position of a sound image in a depth direction.

2. The information processing apparatus according to claim 1, wherein
the audio data includes audio data for a multichannel speaker extracted from the audio content of channel-based audio, and
the mapping processor selects one or more display tiles determined by an arrangement of the multichannel speaker as the mapping destinations.

3. The information processing apparatus according to claim 1, further comprising
a sound source position estimator that estimates a position where a sound source of the audio data is displayed for each audio data,
wherein the mapping processor selects one or more display tiles corresponding to a position where the sound source is displayed as the mapping destinations.

4. The information processing apparatus according to claim 1, further comprising
a band divider that divides the audio data for each frequency band, wherein the mapping processor maps waveform data of a high frequency band having a highest frequency among the audio data to the one or more display tiles to serve as the mapping destinations.

5. The information processing apparatus according to claim 4, wherein
the mapping processor selects one or more speakers corresponding to a position of a sound source of the audio data from a plurality of speakers arranged around a plurality of the display tiles, and maps waveform data of a low frequency band having a lowest frequency among the audio data and waveform data of a middle frequency band between the high frequency band and the low frequency band to the selected one or more speakers.

6. The information processing apparatus according to claim 4, wherein
the mapping processor generates corrected audio data in which a sound pressure level in the high frequency band is higher than or equal to a threshold value from audio data in which a sound pressure level in the high frequency band is smaller than the threshold value, and maps waveform data of the high frequency band of the corrected audio data to the one or more display tiles to serve as the mapping destinations.

7. The information processing apparatus according to claim 5, wherein
the mapping processor sets a timing at which the timing of the waveform data of the high frequency band output to the selected one or more speakers is identical or earlier than the timing at which the waveform data of the middle frequency band and the low frequency band is output to the selected one or more speakers.

8. The information processing apparatus according to claim 1, further comprising
a position detector that detects a spatial arrangement of a plurality of the display tiles and assigns a logical number to each of the display tiles based on the spatial arrangement,
wherein the mapping processor specifies the mapping destinations based on the logical number.

9. The information processing apparatus according to claim 8, wherein
the position detector detects the spatial arrangement of the display tiles based on a time during which a sound output from the display tiles is transmitted to each of microphones provided at a plurality of locations.

10. The information processing apparatus according to claim 1, wherein
the mapping processor adjusts a sound pressure and a phase of a sound output from a plurality of the display tiles as the mapping destinations for each display tile to control directivity of a reproduction sound.

11. The information processing apparatus according to claim 1, wherein
the mapping processor adjusts a sound pressure and a phase of a sound output from a plurality of the display tiles as the mapping destinations for each display tile to reduce reverberation.

12. An information processing method executed by a computer, the method comprising:
extracting one or more audio data corresponding to different sound sources from audio content; and
selecting, for each audio data, one or more display tiles to serve as mapping destinations of the audio data from one or more combinable display tiles including a sound producing mechanism, wherein
the audio data includes audio data of an object extracted from the audio content of object-based audio,
the mapping processor selects one or more display tiles corresponding to a position of the object on a display screen extracted from the audio content as the mapping destinations, and
the mapping processor adjusts a sound pressure and a phase of a sound output from a plurality of the display tiles as the mapping destinations for each display tile to control a position of a sound image in a depth direction.

13. A non-transitory computer readable medium storing instructions that, when executed by a computer, cause the computer to execute the processes of:
extracting one or more audio data corresponding to different sound sources from the audio content; and
selecting, for each audio data, one or more display tiles to serve as mapping destinations of the audio data from one or more combinable display tiles including a sound producing mechanism, wherein
the audio data includes audio data of an object extracted from the audio content of object-based audio,
the mapping processor selects one or more display tiles corresponding to a position of the object on a display screen extracted from the audio content as the mapping destinations, and
the mapping processor adjusts a sound pressure and a phase of a sound output from a plurality of the display tiles as the mapping destinations for each display tile to control a position of a sound image in a depth direction.

14. The information processing apparatus according to claim 1, wherein
the mapping processor adjusts a sound pressure and a phase of a sound output from a plurality of the display tiles as the mapping destinations for each display tile to control a position of a sound image in a depth direction by creating a localized sound image at a focal point away from a reference face.

15. The information processing apparatus according to claim 14, wherein the reference face corresponds to the display screen.

16. The information processing apparatus according to claim 12, wherein
the mapping processor adjusts a sound pressure and a phase of a sound output from a plurality of the display tiles as the mapping destinations for each display tile to control a position of a sound image in a depth direction by creating a localized sound image at a focal point away from a reference face.

17. The information processing apparatus according to claim 16, wherein the reference face corresponds to the display screen.

18. The information processing apparatus according to claim 13, wherein
the mapping processor adjusts a sound pressure and a phase of a sound output from a plurality of the display tiles as the mapping destinations for each display tile to control a position of a sound image in a depth direction by creating a localized sound image at a focal point away from a reference face.

19. The information processing apparatus according to claim 18, wherein the reference face corresponds to the display screen.

* * * * *